United States Patent
Mizoguchi

(10) Patent No.: US 12,497,043 B2
(45) Date of Patent: Dec. 16, 2025

(54) VEHICLE TRAVELING REMOTE CONTROL SYSTEM

(71) Applicant: SUBARU CORPORATION, Tokyo (JP)

(72) Inventor: Masato Mizoguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 518 days.

(21) Appl. No.: 17/942,445

(22) Filed: Sep. 12, 2022

(65) Prior Publication Data

US 2023/0093047 A1 Mar. 23, 2023

(30) Foreign Application Priority Data

Sep. 23, 2021 (JP) .................................. 2021-154933

(51) Int. Cl.
*B60W 30/16* (2020.01)

(52) U.S. Cl.
CPC ......... *B60W 30/16* (2013.01); *B60W 2556/45* (2020.02); *B60W 2710/20* (2013.01); *B60W 2720/106* (2013.01); *B60W 2754/30* (2020.02)

(58) Field of Classification Search
CPC ............. B60W 30/16; B60W 2556/45; B60W 2710/20; B60W 2720/106; B60W 2754/30; G05D 1/0297

See application file for complete search history.

(56) References Cited

U.S. PATENT DOCUMENTS 9,387,855 B2 * 7/2016 Ishihara ............ B60W 60/0059
2013/0131925 A1 * 5/2013 Isaji ................ B60W 30/18145
701/41

(Continued)

FOREIGN PATENT DOCUMENTS

CN         111016975 A  *  4/2020  ............ B61L 25/021
DE   102019108867 A1 * 10/2019  ............ B60W 30/06

(Continued)

OTHER PUBLICATIONS

Original and Machine translation of DE 102019108867 A1 (Year: 2019).*

(Continued)

*Primary Examiner* — Frederick M Brushaber
(74) *Attorney, Agent, or Firm* — Rimon P.C.

(57) ABSTRACT

In a vehicle traveling remote control system, vehicles and a remote control apparatus communicate repeatedly transmit, from the remote control apparatus to each vehicle, a remote control value to be used to control traveling of the vehicle. The vehicle traveling remote control system includes the remote control apparatus and a traveling control unit. The remote control apparatus includes a remote control value generating unit that repeatedly generates the remote control value for traveling control of each vehicle, on the basis of detection information detected by each vehicle. The traveling control unit is provided in each vehicle and executes the traveling control on the basis of the remote control value repeatedly received from the remote control apparatus. The remote control value generating unit generates the remote control value by a process that varies depending on a communication delay of vehicle information including the detection information received from each vehicle.

17 Claims, 14 Drawing Sheets

(56) References Cited

U.S. PATENT DOCUMENTS

| | | | |
|---|---|---|---|
| 2016/0018821 A1* | 1/2016 | Akita | B60W 30/00 |
| | | | 701/2 |
| 2020/0133259 A1 | 4/2020 | Van Wiemeersch et al. | |
| 2020/0189570 A1 | 6/2020 | Yamanaka et al. | |
| 2020/0264634 A1* | 8/2020 | Hadi | B60W 60/0023 |
| 2024/0103540 A1 | 3/2024 | Kameoka | |

FOREIGN PATENT DOCUMENTS

| | | | | |
|---|---|---|---|---|
| JP | 2010-262477 A | 11/2010 | | |
| JP | 2016-107722 A | 6/2016 | | |
| JP | 2018-142921 A | 9/2018 | | |
| JP | 2018-180771 A | 11/2018 | | |
| JP | 2020-042643 A | 3/2020 | | |
| JP | 2020-188407 A | 11/2020 | | |
| JP | 6940036 B | 9/2021 | | |
| WO | WO-2018155159 A1 * | 8/2018 | | B60T 7/12 |
| WO | 2018/235273 A1 | 12/2018 | | |
| WO | WO-2019180700 A1 * | 9/2019 | | B60W 30/16 |

OTHER PUBLICATIONS

Original and Machine translation of WO 2018155159 A1 (Year: 2018).*
CN111016975A Original and translation (Year: 2020).*
Office Action dated May 7, 2025, issued in corresponding Japanese Application No. 2021-154933, 6 pages.

* cited by examiner

VEHICLE TRAVELING REMOTE CONTROL SYSTEM

CROSS-REFERENCE TO RELATED APPLICATIONS

The present application claims priority from Japanese Patent Application No. 2021-154933 filed on Sep. 23, 2021, the entire contents of which are hereby incorporated by reference.

BACKGROUND

The technology relates to a vehicle traveling remote control system.

Traveling of a vehicle, such as an automobile, may be controlled remotely. For example, reference is made to Japanese Unexamined Patent Application Publication Nos. 2018-180771, 2018-142921, and 2020-188407.

SUMMARY

An aspect of the technology provides a vehicle traveling remote control system in which vehicles and a remote control apparatus separate from the vehicles are configured to communicate with each other to repeatedly transmit, from the remote control apparatus to each of the vehicles, a remote control value to be used to control traveling of each of the vehicles. The vehicle traveling remote control system includes the remote control apparatus and a traveling control unit. The remote control apparatus includes a remote control value generating unit configured to repeatedly generate the remote control value for traveling control of each of the vehicles, on the basis of detection information detected by each of the vehicles. The traveling control unit is to be provided in each of the vehicles and configured to execute the traveling control on the basis of the remote control value repeatedly received by the each of the vehicles from the remote control apparatus. The remote control value generating unit is configured to generate the remote control value by a different process that varies depending on a communication delay of vehicle information including the detection information and received by the remote control apparatus from each of the vehicles.

An aspect of the technology provides a vehicle traveling remote control system in which vehicles and a remote control apparatus separate from the vehicles are configured to communicate with each other to repeatedly transmit, from the remote control apparatus to each of the vehicles, a remote control value to be used to control traveling of each of the vehicles. The vehicle traveling remote control system includes the remote control apparatus and circuitry. The remote control apparatus is configured to repeatedly generate the remote control value for traveling control of each of the vehicles, on the basis of detection information detected by each of the vehicles. The circuitry is to be provided in each of the vehicles and configured to execute the traveling control on the basis of the remote control value repeatedly received by the each of the vehicles from the remote control apparatus. The remote control apparatus is configured to generate the remote control value by a process that varies depending on a communication delay of vehicle information including the detection information and received by the remote control apparatus from each of the vehicles.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Figure 1:
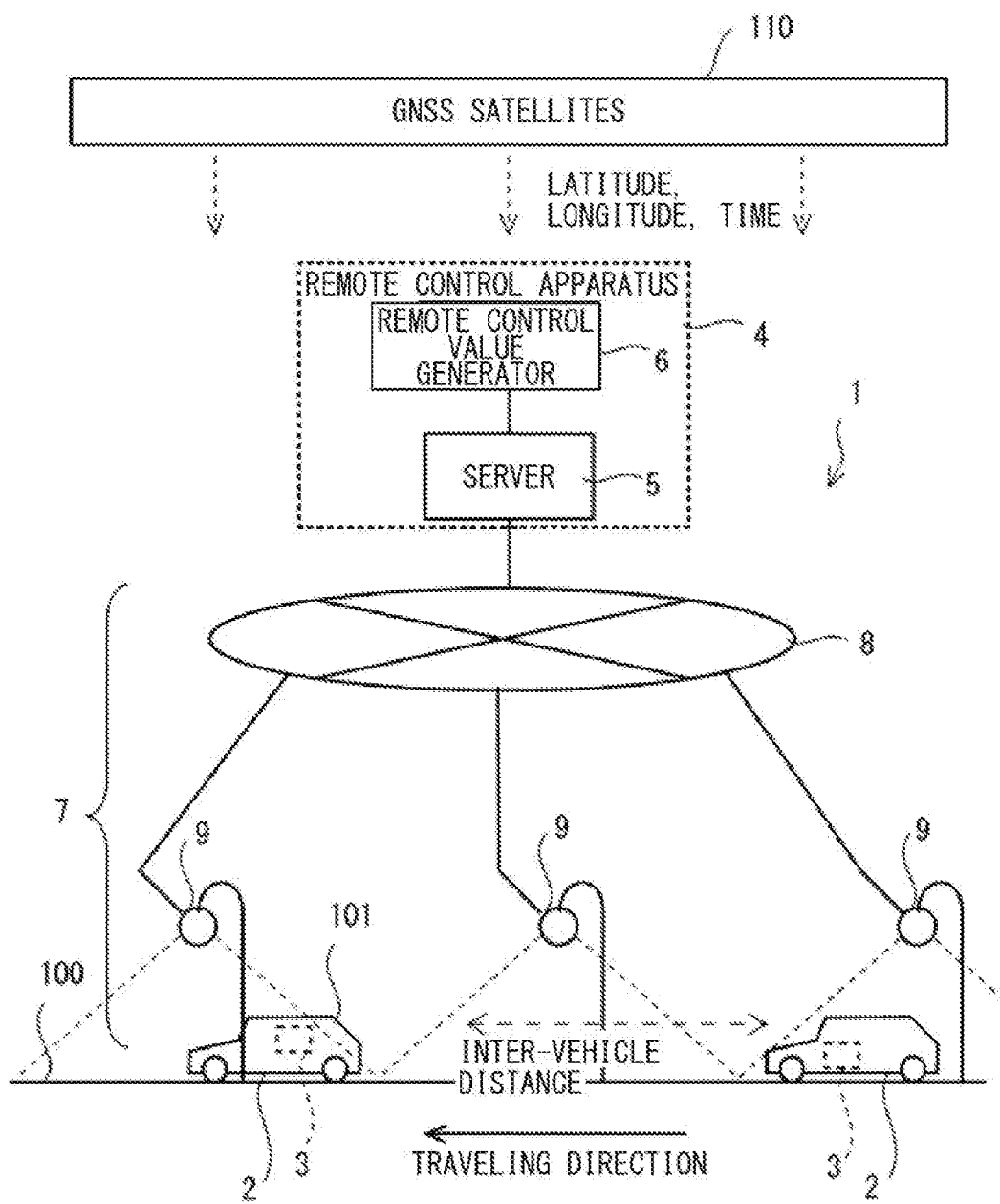
FIG. 1 is a configuration diagram illustrating a remote control system for traveling of a vehicle, according to one example embodiment of the technology.

In a case of remotely controlling traveling of a vehicle, it is desired to enable the vehicle to, for example, repeatedly transmit detection information of an own vehicle sensor to a server serving as a remote control apparatus, and repeatedly receive, from the server, a remote control value to be used to control the traveling of the vehicle. Examples of the detection information include a captured image of a vehicle outside sensor mounted on the own vehicle. Thus, each vehicle that is remotely controlled by the server is able to keep receiving the remote control value from the server, thus being able to control the traveling of the own vehicle.

However, in a case where a plurality of vehicles and the server communicate with each other to transmit the remote control value from the server to each of the plurality of vehicles, communication is necessary for the control. A communication delay tends to fluctuate dynamically depending on a communication environment or processing load on the server. In a case where communication is delayed, even if the vehicle is able to receive the remote control value from the server and execute traveling control, appropriate traveling of the vehicle is not necessarily achieved in the actual traveling environment.

It is thus desired for a vehicle traveling remote control system to reduce the possibility of becoming unable to control traveling of a vehicle appropriately.

It is desirable to provide a vehicle traveling remote control system that makes it possible to reduce the possibility of becoming unable to control traveling of a vehicle appropriately.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

First Example Embodiment

FIG. 1 is a configuration diagram illustrating a remote control system 1 for traveling of a vehicle 2, according to a first example embodiment of the technology.

The remote control system 1 illustrated in FIG. 1 may be configured to make it possible to remotely control the traveling of the vehicle 2. The remote control system 1 may include control systems 3 and a remote control apparatus 4. The respective control systems 3 may be provided in a plurality of vehicles 2. The remote control apparatus 4 may include a server 5 and a remote control value generator 6 configured to generate a remote control value. The plurality of vehicles 2 and the server 5 of the remote control apparatus 4 may be coupled to be able to wirelessly communicate with each other by a communication system 7. The communication system 7 may include a plurality of base stations 9 and a communication network 8. The base stations 9 may be arranged along, for example, a road 100 on which the vehicle 2 travels. The plurality of vehicles 2, and the remote control apparatus 4 separate from the plurality of vehicles 2 communicate with each other. This makes it possible to repeatedly transmit, from the remote control apparatus 4 to each of the plurality of vehicles 2, the remote control value to be used to control the traveling of the vehicle 2.

FIG. 1 illustrates global navigation satellite system (GNSS) satellites 110 that output GNSS radio waves receivable by the plurality of vehicles 2 and the server 5. The vehicle 2 or the server 5 is able to obtain its position and time based on a common positioning system by receiving the radio waves from the GNSS satellites 110.

The vehicle 2 may be, for example, an automobile. The vehicle 2 may also be referred to as an own vehicle. Other non-limiting examples of the vehicle 2 may include a motorcycle, a cart, and a personal mobility. Under traveling control of the control system 3 provided in the own vehicle, the vehicle 2 may be caused to travel on, for example, the road 100 by driving force of an engine or a motor serving as a power source, caused to decelerate and stop by actuation of a braking device, and caused to change its traveling direction leftward or rightward by actuation of a steering device. The control system 3 of the vehicle 2 may be basically configured to perform the traveling control based on manual driving on the basis of an operation performed by an occupant of the own vehicle, perform control of assisting traveling based on manual driving on the basis of a detection result obtained by the own vehicle, and perform the traveling control based on automatic driving by using, for example, high-precision map data together with the detection result obtained by the own vehicle.

FIG. 1 also illustrates a preceding vehicle 101 that travels in front of the vehicle 2.

The plurality of base stations 9 may include, for example, the base station 9 of a carrier communication network for mobile terminals, etc., and the base station 9 for ITS service or ADAS service for the vehicle 2. The base station 9 of the carrier communication network may be, for example, the fifth-generation base station 9. The base station 9 may be fixedly installed on, for example, a road shoulder, a road surface, or a building, or may be mounted on a mobile body, such as the vehicle 2, a vessel, a drone, or an aircraft.

The base station 9 may establish a wireless communication path for transmission and reception of information with an access point (AP) communicator of the control system 3 of the vehicle 2 present within the reach of radio waves. In a case where the vehicle 2 travels on the road 100 to move out of the reach of radio waves, the base station 9 that establishes the wireless communication path may switch between the plurality of base stations 9. Thus, the plurality of base stations 9 arranged along the road 100, for example, enable the vehicle 2 to keep establishing the wireless communication path constantly while traveling.

A wireless communication path that is established with the fifth-generation base station 9 makes it possible to transmit and receive a significantly large amount of information at high speed, as compared with a wireless communication path that is established with the fourth-generation base station 9. The fifth-generation base station 9 may have advanced information processing ability; for example, the base stations 9 may be configured to transmit and receive information to and from each other. Although the vehicles 2 may directly transmit and receive information to and from each other in vehicle-to-vehicle (V2V) communication of the vehicles 2, the vehicles 2 may transmit and receive information to and from each other via the fifth-generation base station 9.

It is expected that using the fifth-generation base station 9 enables the remote control apparatus 4 and each vehicle 2 to communicate with each other at high speed with a delay time of about 100 milliseconds at maximum in one direction, i.e., an upstream direction or a downstream direction. However, in a case where the plurality of vehicles 2 communicate with the remote control apparatus 4, it is difficult to achieve communication at the maximum communication speed equally for the plurality of vehicles 2.

In a case where the vehicle 2 is traveling, the base station 9 with which the vehicle 2 establishes the communication path may switch in response to a change in the position of the vehicle 2. A handover process for switching of the base station 9 can take time.

The communication network 8 may include, for example, the communication network 8 for the carrier communication network, the communication network 8 for the ITS service or the ADAS service, and the Internet, which is an open wide-area communication network. The communication network 8 may include a dedicated communication network 8 newly provided for the remote control system 1. The communication network 8 for the carrier communication network and the Internet may achieve best-effort communication. On the best-effort communication network 8, a communication band available to each device and a transmission delay of communication may dynamically change depending on a communication environment, instead of being fixed. For example, on the communication network 8 for communication based on a TCP/IP protocol, collision due to asynchronous communication can occur, which can cause a transmission delay due to frame retransmission. A transmission delay due to frame retransmission is likely to occur in a case where the handover process takes time.

Figure 2:
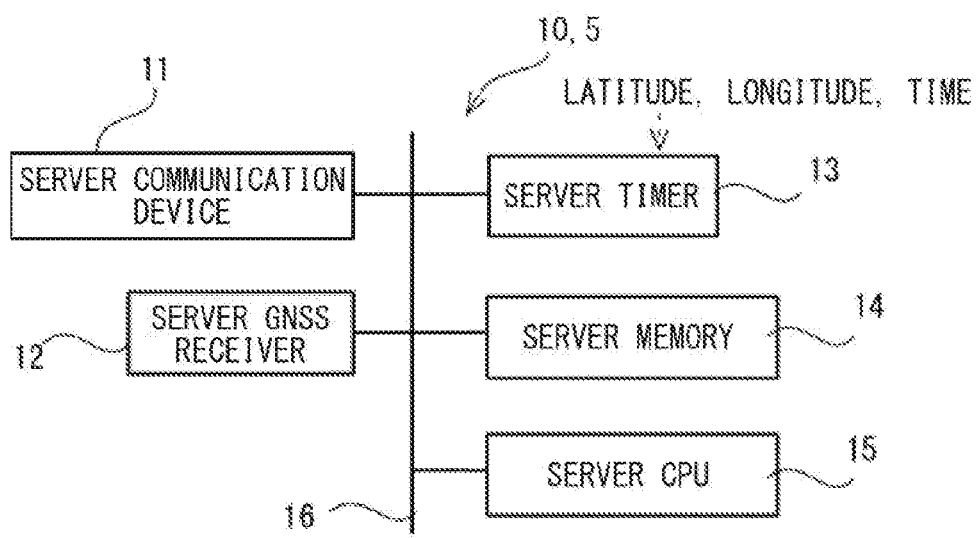
FIG. 2 is a hardware configuration diagram illustrating a computer that may be used for a server of a remote control apparatus illustrated in FIG. 1.

FIG. 2 is a hardware configuration diagram illustrating a computer 10 that may be used for the server 5 of the remote control apparatus 4 illustrated in FIG. 1.

The computer 10 illustrated in FIG. 2 may include a server communication device 11, a server GNSS receiver 12, a server timer 13, a server memory 14, a server CPU 15, and a server bus 16. The server communication device 11, the server GNSS receiver 12, the server timer 13, the server memory 14, and the server CPU 15 may be coupled to the server bus 16.

The server communication device 11 may be coupled to the communication network 8. The server communication device 11 may transmit and receive information to and from another device coupled to the communication network 8, for example, the base station 9 or the control system 3 of the vehicle 2.

The server GNSS receiver 12 may receive the radio waves from the GNSS satellites 110 to obtain a current time.

The server timer 13 may measure a time and a time period. The time of the server timer 13 may be calibrated by the current time of the server GNSS receiver 12.

The server memory 14 may hold a program to be executed by the server CPU 15, and data.

The server CPU 15 may read the program from the server memory 14 and execute the program. This enables a server control unit to be implemented in the server 5.

The server CPU 15 serving as the server control unit may manage overall operation of the server 5 and overall control of the remote control system 1. The server CPU 15 may manage, for example, the plurality of vehicles 2 that use the remote control system 1, and traveling of the plurality of vehicles 2.

For example, the server CPU 15 may manage information received from each of the plurality of vehicles 2, control generation of the remote control value for the vehicle 2 from which the information has been received, and control transmission of the remote control value generated for the vehicle 2 from which the information has been received. In this case, the server memory 14 may hold the information received from the plurality of vehicles 2 and the high-precision map data, for example, to be used to generate the remote control value. The server CPU 15 may repeat the generation and transmission of the remote control value for each vehicle 2, by repeatedly receiving the latest information from each vehicle 2. This enables each vehicle 2 to continue the traveling based on the remote control value repeatedly generated by the remote control apparatus 4.

The remote control value generator 6 may be basically configured to be able to operate similarly to a traveling control ECU 24 of the control system 3 of the vehicle 2 to be described later. The computer 10 illustrated in FIG. 2 may be used as hardware for the remote control value generator 6. In one embodiment, the remote control value generator 6 may serve as a "remote control value generating unit".

Although the example embodiment describes that the remote control value generator 6 configured to generate the remote control value for each vehicle is separate from the server 5 that manages communication of the remote control apparatus 4, the remote control value generator 6 and the server 5 may be implemented by one computer 10.

The remote control value generator 6 may repeatedly generate, for each vehicle 2, the remote control value available for traveling control of each of the plurality of vehicles 2.

Accordingly, the server 5 that manages the communication of the remote control apparatus 4 may be coupled to a plurality of remote control value generators 6 in a one-to-many relationship. The remote control value generator 6 may be basically provided, in one-to-one correspondence, for each of the plurality of vehicles 2 that are managed by the remote control apparatus 4. However, one remote control value generator 6 may generate the remote control value for the plurality of vehicles 2. For example, the plurality of remote control value generators 6 may be provided for each type of the vehicle 2, because the remote control value generator 6 is configured to generate the remote control value for the traveling control of the vehicle. Different types of vehicles 2 are basically assumed to differ in traveling characteristics and traveling control characteristics.

Figure 3:
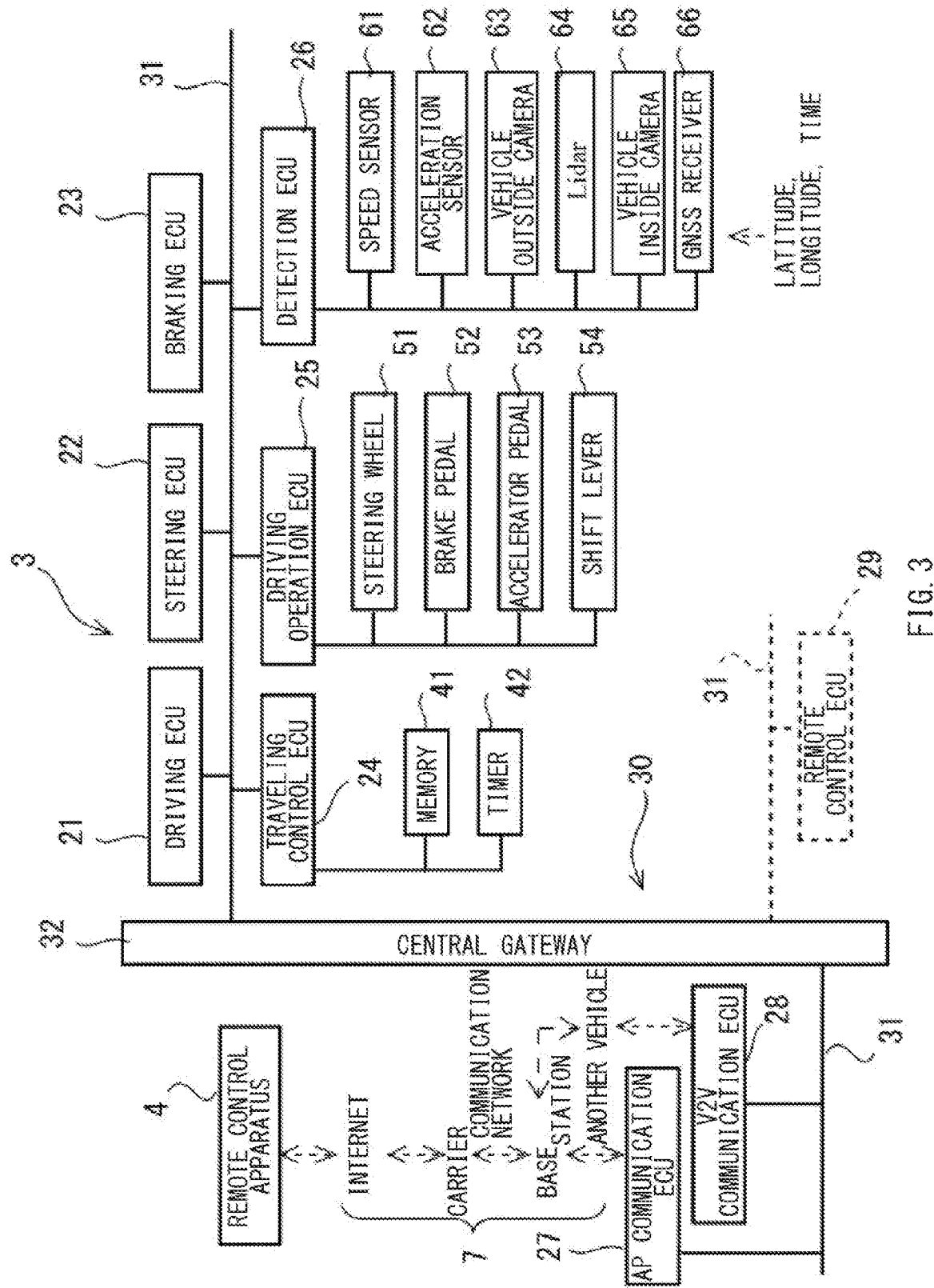
FIG. 3 is a configuration diagram illustrating a control system that controls the traveling of the vehicle illustrated in FIG. 1.

FIG. 3 is a configuration diagram illustrating the control system 3 that controls the traveling of the vehicle 2 illustrated in FIG. 1.

FIG. 3 illustrates, as representatives, respective control electronic control units (ECUs) incorporated in a plurality of control devices included in the control system 3 provided in the vehicle 2. As with the server 5 illustrated in FIG. 2, each of the control devices may include, in addition to the control ECU, for example, an unillustrated memory, an unillustrated input and output port, an unillustrated timer, and an unillustrated internal bus. The memory may hold a control program and data. The timer may measure a time period and a time. The memory, the input and output port, and the timer may be coupled to the internal bus.

FIG. 3 illustrates, as the plurality of control ECUs included in the control system 3 of the vehicle 2, for example, a driving ECU 21 for a driving device, a steering ECU 22 for the steering device, a braking ECU 23 for the braking device, the traveling control ECU 24, a driving operation ECU 25, a detection ECU 26, an AP communication ECU 27, and a V2V communication ECU 28. The control system 3 of the vehicle 2 may include another unillustrated control ECU.

The plurality of control ECUs may be coupled to a vehicle network 30 such as a controller area network (CAN) or a local interconnect network (LIN) used in the vehicle 2. The vehicle network 30 may include a plurality of bus cables 31 and a central gateway (CGW) 32. The plurality of bus cables 31 may allow the plurality of control ECUs to be coupled to each other. The central gateway (CGW) 32 may serve as a relay to which the plurality of bus cables 31 are coupled. Identifications (IDs) different from each other may be assigned to the plurality of control ECUs. The IDs may each serve as identification information. The control ECUs may each basically output data to other control ECUs periodically. The data may have an ID for one of the control ECUs and another ID for another one of the control ECUs. The one of the control ECUs may represent a source of output. The other one of the control ECUs may represent a destination of output. Each of the other control ECUs may monitor the bus cables 31. In a case where an ID that represents a destination of output corresponds to the ID of one of the control ECUs, for example, the one of the control ECUs may acquire data, and execute processing on the basis of the data. The central gateway 32 may monitor each of the plurality of bus cables 31 coupled thereto. In a case where one of the control ECUs representing a source of output is coupled to one of the bus cables 31, another one of the control ECUs is coupled to another one of the bus cables 31, and the central gateway 32 detects that an ID representing a destination of output corresponds to the other one of the control ECUs, the central gateway 32 may output data to the other one of the bus cables 31. Through the relaying performed by the central gateway 32, while one of the plurality of control ECUs is coupled to one of the bus cables 31, and another one of the control ECUs is coupled to another one of the bus cables 31, exchanging of data to be inputted and outputted may be achieved between the one of the plurality of control ECUs and the other one of the plurality of control ECUs.

The driving operation ECU 25 may be coupled to operation members. The operation members may be used by the occupant to control the traveling of the vehicle 2. Non-limiting examples of the operation members may include a steering wheel 51, a brake pedal 52, an accelerator pedal 53, and a shift lever 54. As one of the operation members is operated, the driving operation ECU 25 may output data to the vehicle network 30. The data may include whether there is an operation and an amount of the operation. The driving operation ECU 25 may execute processing regarding the operation that is made on the one of the operation members. The driving operation ECU 25 may include a result of the processing in the data.

The detection ECU 26 may be coupled to own vehicle sensors configured to detect a traveling environment of the vehicle 2. Non-limiting examples of the own vehicle sensors may include a speed sensor 61, an acceleration sensor 62, a vehicle outside camera 63, a LIDAR 64, a vehicle inside camera 65, and a GNSS receiver 66. The speed sensor 61 may detect a speed of the vehicle 2. The acceleration sensor 62 may detect an acceleration rate of the vehicle 2. The vehicle outside camera 63 may capture an image of the outside of the vehicle 2. The LIDAR 64 may detect an object present outside the vehicle 2 by laser irradiation. The vehicle inside camera 65 may capture an image of the inside of the vehicle 2. The GNSS receiver 66 may detect the position of the vehicle 2. The vehicle outside camera 63 may be, for example, a stereo camera, a monocular camera, or a 360-degree camera. The vehicle outside camera 63 may serve as a vehicle outside sensor. The GNSS receiver 66 may receive the radio waves from the GNSS satellites 110, as with the server GNSS receiver 12, to obtain a latitude, a longitude, and an altitude, indicating the current position of the own vehicle, and a current time. It is thus expected that the current time of the vehicle 2 match, with high precision, the current time based on the server GNSS receiver 12 of the server 5. The detection ECU 26 may output, to the vehicle network 30, for example, detection information acquired from the own vehicle sensor and a processing result based on the detection information. For example, the detection ECU 26 may execute a process of recognizing a pedestrian, a traffic light, another vehicle, and a road shape outside the vehicle, included in the captured image of the vehicle outside camera 63, and output a result of the recognition to the vehicle network 30.

Note that the detection ECU 26 may be coupled to an occupant sensor other than the vehicle inside camera 65, such as a vehicle inside millimeter-wave sensor, a seating sensor, or a sensor for the steering wheel 51.

The AP communication ECU 27 may be an AP communication device serving as the AP communicator. The AP communication ECU 27 may establish a wireless communication path between the vehicle 2 and the base station 9. In remote control, the AP communication ECU 27 may repeat transmission and reception of data to and from the server 5 of the remote control apparatus 4 by using the wireless communication path established with the base station 9.

The V2V communication ECU 28 may be a V2V communication device serving as a V2V communicator. The V2V communication ECU 28 may execute V2V communication between the vehicle 2 and another vehicle. The V2V communication ECU 28 may communicate with the other vehicle that has established a wireless communication path with the base station 9. This enables the V2V communication ECU 28 to, for remote control, repeat transmission and reception of data to and from the server 5 of the remote control apparatus 4 via the other vehicle.

The traveling control ECU 24 may be coupled to a memory 41 and a timer 42. The memory 41 may be a computer-readable recording medium. The memory 41 may hold, for example, a program to be executed by the traveling control ECU 24, and data. The memory 41 may hold, for example, data for driving assistance, such as lane keep control or inter-vehicle distance control, and the high-precision map data for automatic driving.

The traveling control ECU 24 may read the program from the memory 41, and execute the program. This enables the traveling control ECU 24 to serve as a control unit configured to control the traveling of the vehicle 2.

The traveling control ECU 24 serving as the control unit that controls the traveling of the vehicle 2 may acquire information from each unit of the control system 3 of the vehicle 2 to control the traveling of the own vehicle.

Upon acquiring information on a manual operation of the occupant from, for example, the driving operation ECU 25, the traveling control ECU 24 may generate an own vehicle control value based on the manual operation of the occupant as it is, or generate the own vehicle control value finely adjusted to assist the manual operation of the occupant. In one embodiment, the own vehicle control value may serve as a "vehicle control value".

In automatic driving, for example, the traveling control ECU 24 may acquire information from the detection ECU 26, determine the own vehicle position on the high-precision map data and the possibility of coming into contact with another vehicle, and generate the own vehicle control value for the automatic driving. The automatic driving may be achieved by, for example, the own vehicle control value for steering and the own vehicle control value for acceleration or deceleration. The own vehicle control value for steering may be used for the lane keep control to keep a lateral position of the vehicle 2 near the middle of a lane. The own vehicle control value for acceleration or deceleration may be used to control a longitudinal position of the vehicle 2 to keep an inter-vehicle distance.

The traveling control ECU 24 may output these generated own vehicle control values to the driving ECU 21, the steering ECU 22, and the braking ECU 23 via the vehicle network 30.

This enables the traveling control ECU 24 to generate the own vehicle control value to be used for the traveling control of the vehicle 2 on the basis of the operation performed by the occupant of the own vehicle or the automatic driving. The traveling control ECU 24 may serve as an own vehicle control value generating unit. In one embodiment, the traveling control ECU 24 may serve as a "vehicle control value generating unit".

In remotely controlling the traveling of the own vehicle, the traveling control ECU 24 serving as the control unit that controls the traveling of the vehicle 2 may communicate with the server 5 of the remote control apparatus 4 by using the AP communication ECU 27 or the V2V communication ECU 28, and acquire the remote control value from the server 5.

The remote control value generator 6 of the remote control apparatus 4 may generate the remote control values equivalent to the above-described own vehicle control values to be generated by the traveling control ECU 24, by a process similar to a generation process to be performed for the automatic driving by the traveling control ECU 24.

The traveling control ECU 24 may output these acquired remote control values to the driving ECU 21, the steering ECU 22, and the braking ECU 23 via the vehicle network 30.

This enables the traveling control ECU 24 to execute the traveling control based on the remote control value repeatedly received from the remote control apparatus 4. In one embodiment, the traveling control ECU 24 may serve as a "traveling control unit".

The driving ECU 21 may receive a control value generated or acquired by the traveling control ECU 24. The driving ECU 21 may thereby control the acceleration of the vehicle 2 on the basis of the control value by controlling operation of a driving force source, such as the engine or the motor, of the vehicle 2. The driving ECU 21 may serve as a traveling processor.

The steering ECU 22 may receive a control value generated or acquired by the traveling control ECU 24. The steering ECU 22 may thereby control the traveling direction of the vehicle 2 on the basis of the control value by controlling operation of a steering force generator, such as a motor for the steering wheel 51, of the vehicle 2. The steering ECU 22 may serve as the traveling processor.

The braking ECU 23 may receive a control value generated or acquired by the traveling control ECU 24. The braking ECU 23 may thereby control the deceleration of the vehicle 2 on the basis of the control value by controlling operation of a braking force generator, such as a brake pump, of the vehicle 2. The braking ECU 23 may serve as the traveling processor.

Figure 4:
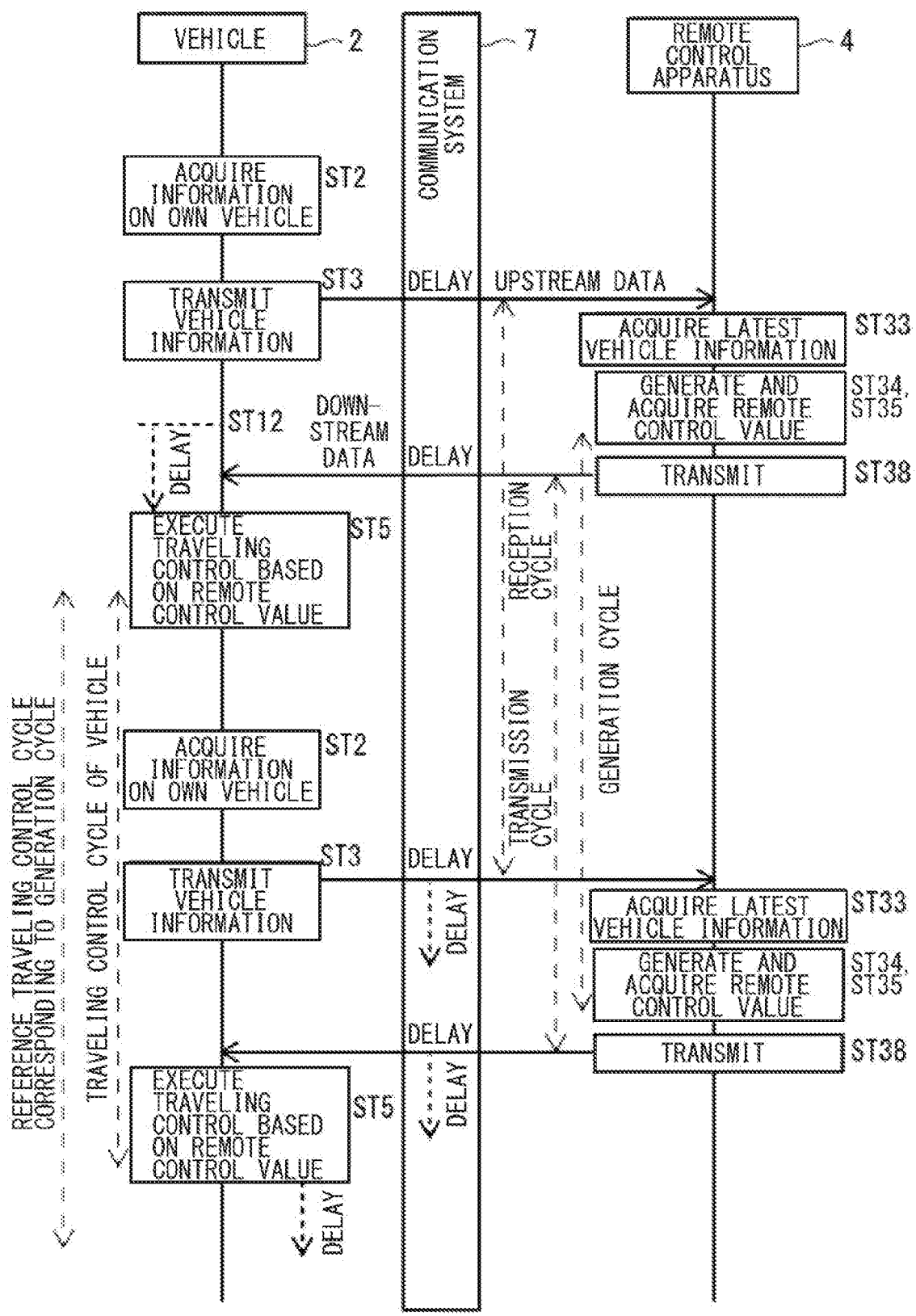
FIG. 4 is a timing chart illustrating a basic flow of remote control in the remote control system illustrated in FIG. 1.

FIG. 4 is a timing chart illustrating a basic flow of the remote control in the remote control system 1 illustrated in FIG. 1.

FIG. 4 illustrates an example in which one vehicle 2 repeatedly communicates with the remote control apparatus 4 via the communication system 7 including, for example, the communication network 8. In FIG. 4, time may flow from the top to the bottom.

In FIG. 4, the vehicle 2 may first acquire information on the own vehicle in step ST2, and transmit vehicle information to the remote control apparatus 4 via the communication system 7 in step ST3. The vehicle 2 may transmit, to the remote control apparatus 4, at least the detection information of the own vehicle sensor and the position and the time of the own vehicle. The detection information of the own vehicle sensor may include the captured image of the vehicle outside sensor mounted on the own vehicle.

The remote control apparatus 4 may receive such upstream data from the vehicle 2. Thereafter, the remote control apparatus 4 may acquire the latest vehicle information regarding the vehicle 2 in step ST33, generate and acquire the remote control value by using the vehicle information received from each vehicle 2 in step ST34 and step ST35, and transmit the acquired remote control value to the vehicle 2 via the communication system 7 in step ST38.

The vehicle 2 may receive such downstream data from the remote control apparatus 4. Thereafter, the vehicle 2 may execute the traveling control based on the remote control value in step ST5. The vehicle 2 may acquire, from the remote control apparatus 4, the remote control value receivable by the traveling processor as with the own vehicle control value generated by the own vehicle, and execute the traveling control.

The vehicle 2 and the remote control apparatus 4 may repeat the series of processes described above. This enables the vehicle 2 to receive a plurality of remote control values repeatedly transmitted from the remote control apparatus 4, and continuously execute the traveling control based on the remote control value. The vehicle 2 is able to travel on the basis of the remote control, by executing the traveling control of the vehicle 2 in a traveling control cycle corresponding to a reception cycle of the plurality of remote control values transmitted from the remote control apparatus 4.

In such remote control, it is important that the remote control value transmitted by the remote control apparatus 4 be received by the vehicle 2 in an appropriate cycle or at an appropriate timing, in terms of safety and reliability of the traveling of the vehicle 2 that is controlled remotely. Communication has to be performed for the remote control. In the traveling control of the vehicle 2, it may be desired to execute the control in a cycle of every 100 milliseconds, at least a traveling control cycle of about 200 milliseconds. Otherwise, in some traveling environments, it can be predicted that, for example, sufficiently reliable lane keep control or inter-vehicle distance control based on the remote control is not achieved. In other words, even if each vehicle 2 that is controlled remotely is able to keep receiving the remote control value continuously, the vehicle 2 can become unable to appropriately control the traveling of the own vehicle in accordance with the actual traveling environment in a case where the vehicle 2 is unable to receive, at an appropriate timing, the remote control value necessary for the traveling control of the own vehicle. For example, in a case where a preceding vehicle 101 decelerates by sudden braking or in a case where the own vehicle enters a curve, a delay in receiving the remote control value can influence quality of the traveling control of the own vehicle.

On the other hand, it is not easy for the remote control apparatus 4 to always achieve a transmission cycle or reception cycle of 100 milliseconds for all of the plurality of vehicles 2 in terms of, for example, processing load. In a case of using the communication network 8 of the carrier communication network for mobile terminals, etc. for a part of the communication network 8, for example, a communication delay can be caused by communication for other purposes, even if the communication network 8 is a fifth-generation communication network. Such a communication delay tends to fluctuate dynamically depending on the communication environment or the processing load on the server.

It may thus be desired for the remote control system 1 for the traveling of the vehicle 2 to reduce the possibility of becoming unable to remotely control the traveling of the vehicle 2 appropriately.

The vehicle 2 may be in a reception wait state for the downstream data from the remote control apparatus 4, in a response cycle of the remote control apparatus 4. The response cycle may be from the transmission of the vehicle information as the upstream data to the remote control apparatus 4 in step ST3 until the reception of the downstream data from the remote control apparatus 4. If it is possible to shorten the response cycle depending on the traveling environment, it is possible to shorten the traveling control cycle as well.

As illustrated in FIG. 4, a timing of executing the traveling control in step ST5 in the remote control may be basically delayed, as compared with a timing of executing the traveling control in step ST12 based on the own vehicle control value to be described later.

A delay in the reception cycle of the upstream data or a delay in the transmission cycle of the downstream data may result in a delay in the timing of executing step ST5 in the vehicle 2.

Figure 5:
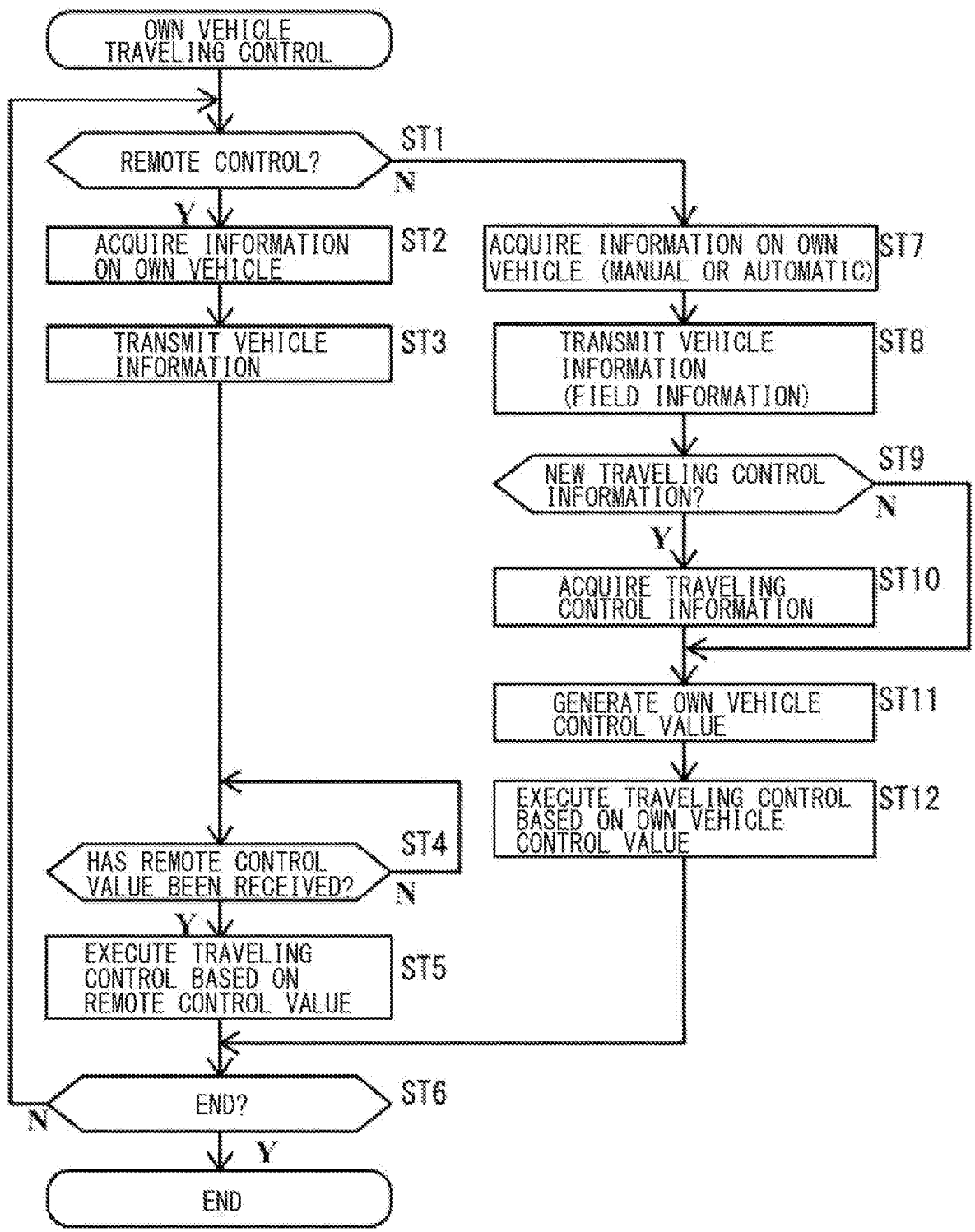
FIG. 5 is a flowchart illustrating own vehicle traveling control to be performed by the control system of the vehicle illustrated in FIG. 1.

FIG. 5 is a flowchart illustrating own vehicle traveling control to be performed by the control system 3 of the vehicle 2 illustrated in FIG. 1.

The own vehicle traveling control illustrated in FIG. 5 may control the traveling of the own vehicle by switching between remote control processes of steps ST2 to ST5 and own vehicle control processes of steps ST7 to ST12.

The traveling control ECU 24, for example, of the control system 3 of the vehicle 2 may repeatedly execute the own vehicle traveling control illustrated in FIG. 5 to control the traveling of the own vehicle.

Note that a control ECU other than the traveling control ECU 24 of the control system 3 of the vehicle 2, such as a remote control ECU 29 indicated by a dashed line in FIG. 3, may repeatedly execute some processes of the own vehicle traveling control illustrated in FIG. 5, for example, processes of step ST2 to ST6 of FIG. 5. The same applies to control illustrated in each of the following flowcharts.

In step ST1, the traveling control ECU 24 of the control system 3 of the vehicle 2 may determine whether to select the remote control as the traveling control of the own vehicle. The traveling control ECU 24 may determine whether to select the remote control on the basis of, for example, an operation performed by the occupant of the own vehicle. If the traveling control ECU 24 selects the remote control (ST1: Y), the traveling control ECU 24 may cause the flow to proceed to step ST2. If the traveling control ECU 24 does not select the remote control (ST1: N), the traveling control ECU 24 may cause the flow to proceed to step ST7.

From step ST2, the traveling control ECU 24 may start the remote control. The traveling control ECU 24 may acquire the vehicle information of the own vehicle detected by the own vehicle. The vehicle information may include at least the detection information of the own vehicle sensor, the position and the time of the own vehicle obtained by the GNSS receiver 66, the speed, the acceleration rate, and a steering angle, for example. The detection information of the own vehicle sensor may include the captured image of the vehicle outside sensor mounted on the own vehicle.

In step ST3, the traveling control ECU 24 may transmit the vehicle information of the own vehicle acquired in step ST2 to the remote control apparatus 4. The traveling control ECU 24 may transmit the vehicle information of the own vehicle to the remote control apparatus 4 by using the communication path established by the AP communication ECU 27 or the communication path established by the V2V communication ECU 28. The vehicle information of the own vehicle transmitted from the vehicle 2 may be received by the server communication device 11 of the server 5 of the remote control apparatus 4 via, for example, the base station 9, the carrier communication network, and the Internet. The remote control apparatus 4 may use the vehicle information received from each vehicle 2 to generate a remote control value for the vehicle 2, and transmit the remote control value to the vehicle 2 that has transmitted the vehicle information.

In step ST4, the traveling control ECU 24 may wait for reception of a remote control value from the remote control apparatus 4. The traveling control ECU 24 may repeat this process until a remote control value is received from the remote control apparatus 4. If the AP communication ECU 27 or the V2V communication ECU 28 receives a remote control value transmitted as the downstream data from the remote control apparatus 4 to the own vehicle (ST4: Y), the traveling control ECU 24 may cause the flow to proceed to step ST5.

In step ST5, the traveling control ECU 24 may execute the traveling control based on the remote control value acquired from the remote control apparatus 4 by the reception. The traveling control ECU 24 may output the remote control value to the driving ECU 21, the steering ECU 22, and the braking ECU 23. The driving ECU 21, the steering ECU 22, and the braking ECU 23 may each execute traveling control on the basis of the received remote control value. This enables the traveling of the vehicle 2 to be controlled by the remote control value generated by the remote control apparatus 4.

In step ST6, the traveling control ECU 24 may determine whether to end the traveling control. For example, in a case where the occupant operates an unillustrated ignition switch, the traveling control ECU 24 may determine to end the traveling control, and end this control. If the traveling control ECU 24 does not end the traveling control (ST6: N), the traveling control ECU 24 may cause the flow to return to step ST1. The traveling control ECU 24 may repeatedly execute, for example, the remote traveling control described above until the traveling control ECU 24 determines to end the traveling control in step ST6. This enables the traveling of the vehicle 2 to keep being controlled by the plurality of remote control values repeatedly generated by the remote control apparatus 4.

Step ST7 may be the own vehicle control process that is started in a case where the traveling control ECU 24 determines not to select the remote control in step ST1. The traveling control ECU 24 may acquire the vehicle information of the own vehicle detected by the own vehicle. The vehicle information of the own vehicle that is acquired in step ST7 may be the same as the vehicle information of the own vehicle that is acquired in step ST2.

In step ST8, the traveling control ECU 24 may transmit the vehicle information of the own vehicle acquired in step ST7 to the remote control apparatus 4. The traveling control ECU 24 may transmit the vehicle information of the own vehicle to the remote control apparatus 4 by using the communication path established by the AP communication ECU 27 or the communication path established by the V2V communication ECU 28. The vehicle information of the own vehicle transmitted from the vehicle 2 may be received by the server communication device 11 of the server 5 of the remote control apparatus 4 via, for example, the base station 9, the carrier communication network, and the Internet. The remote control apparatus 4 may perform mapping of the positions of the plurality of vehicles 2 in a virtual space based on the high-precision map data, and generate, for example, a range in which each vehicle 2 is able to travel and a direction in which each vehicle 2 is able to travel, on the basis of the mapping. The remote control apparatus 4 may transmit, to the vehicle 2 that has transmitted the vehicle information, traveling control information including the generated range and direction in which the vehicle 2 is able to travel. The remote control apparatus 4 may additionally generate, for example, speed limit information and a lane or course along which the vehicle 2 is able to travel, and transmit such generated information to the vehicle 2 that has transmitted the vehicle information.

In step ST9, the traveling control ECU 24 may determine whether the AP communication ECU 27 or the V2V communication ECU 28 has received new traveling control information from the remote control apparatus 4. If new traveling control information has been received (ST9: Y), the traveling control ECU 24 may cause the flow to proceed to step ST10. If new traveling control information has not been received (ST9: N), the traveling control ECU 24 may cause the flow to proceed to step ST11.

In step ST10, the traveling control ECU 24 may acquire the new traveling control information.

In step ST11, the traveling control ECU 24 may autonomously generate an own vehicle control value in the own vehicle, on the basis of the vehicle information acquired from each unit of the own vehicle in step ST7. In a case where the new traveling control information has been acquired in step ST10, the traveling control ECU 24 may generate the own vehicle control value for traveling within the range of the traveling control information.

In step ST12, the traveling control ECU 24 may execute the traveling control based on the own vehicle control value generated by the own vehicle. The traveling control ECU 24 may output the own vehicle control value to the driving ECU 21, the steering ECU 22, and the braking ECU 23. The driving ECU 21, the steering ECU 22, and the braking ECU 23 may each execute the traveling control on the basis of the received own vehicle control value. This enables the traveling of the vehicle 2 to be autonomously controlled by the own vehicle. Thereafter, the traveling control ECU 24 may cause the flow to proceed to step ST6. The traveling control ECU 24 may repeatedly execute, for example, the autonomous traveling control of the own vehicle described above until the traveling control ECU 24 determines to end the traveling control in step ST6. This enables the traveling of the vehicle 2 to keep being controlled by the plurality of own vehicle control values repeatedly generated on an autonomous basis by the own vehicle.

Figure 6:
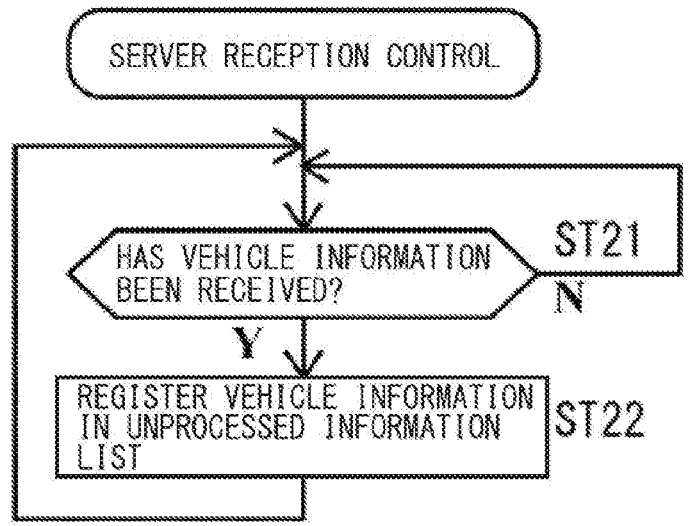
FIG. 6 is a flowchart illustrating reception control to be performed by the server of the remote control apparatus illustrated in FIG. 1.

FIG. 6 is a flowchart illustrating reception control to be performed by the server 5 of the remote control apparatus 4 illustrated in FIG. 1.

The server CPU 15 of the server 5 of the remote control apparatus 4 may repeatedly execute the reception control illustrated in FIG. 6.

In step ST21, the server CPU 15 of the server 5 of the remote control apparatus 4 may determine whether new vehicle information has been received from the vehicle 2. If new vehicle information has not been received from the vehicle 2 (ST21: N), the server CPU 15 may repeat this process. If the server communication device 11 receives new vehicle information (ST21: Y), the server CPU 15 may cause the flow to proceed to step ST22.

In step ST22, the server CPU 15 may register the received vehicle information of the vehicle 2 in an unprocessed information list 70 of the server memory 14.

Thereafter, the server CPU 15 may cause the flow to return to step ST21, and repeat the processes from step ST21 to step ST22. Thus, in a case where new vehicle information is received from one vehicle 2 or vehicle information is received from another vehicle different from the one vehicle 2, the server 5 is able to temporarily hold such new vehicle information, by adding the vehicle information to the unprocessed information list 70 of the server memory 14 or updating the unprocessed information list 70 with the vehicle information.

Figure 7:
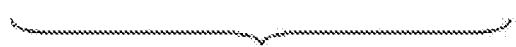
FIG. 7 is an explanatory diagram illustrating an unprocessed information list that is recordable in a memory of the server of the remote control apparatus illustrated in FIG. 1 by, for example, the reception control illustrated in FIG. 6.

FIG. 7 is an explanatory diagram illustrating the unprocessed information list 70 recordable in the server memory 14 of the server 5 of the remote control apparatus 4 illustrated in FIG. 1 by, for example, the reception control illustrated in FIG. 6.

The unprocessed information list 70 of FIG. 7 may include a plurality of records for the respective vehicles 2 from which the remote control apparatus 4 has ever received the vehicle information.

A first record 71 from the top in FIG. 7 may be a record regarding the vehicle 2 assigned with identification information (ID) 001, and may hold a plurality of times at which the vehicle information has been received from the vehicle 2 and the latest vehicle information of the vehicle 2.

A second record 72 from the top may be a record regarding the vehicle 2 assigned with identification information 002, and may hold a plurality of times at which the vehicle information has been received from the vehicle 2 and the latest vehicle information of the vehicle 2.

A third record 73 from the top may be a record regarding the vehicle 2 assigned with identification information 003, and may hold a plurality of times at which the vehicle information has been received from the vehicle 2 and the latest vehicle information of the vehicle 2.

The unprocessed information list 70 of FIG. 7 may hold, as the plurality of times, the latest reception time and the previous reception time immediately before the latest reception time. The previous reception time may be subtracted from the latest reception time to thereby obtain the reception cycle regarding the vehicle 2. As illustrated in FIG. 4, the reception cycle may basically correspond favorably to the transmission cycle and a generation cycle, and consequently to the traveling control cycle of the vehicle 2.

The unprocessed information list 70 of FIG. 7 may hold the plurality of records in an order in which the vehicle information has been received.

The first record 71 may not hold unprocessed vehicle information, because the vehicle information from the vehicle 2 including the latest vehicle information has been processed.

Figure 8:
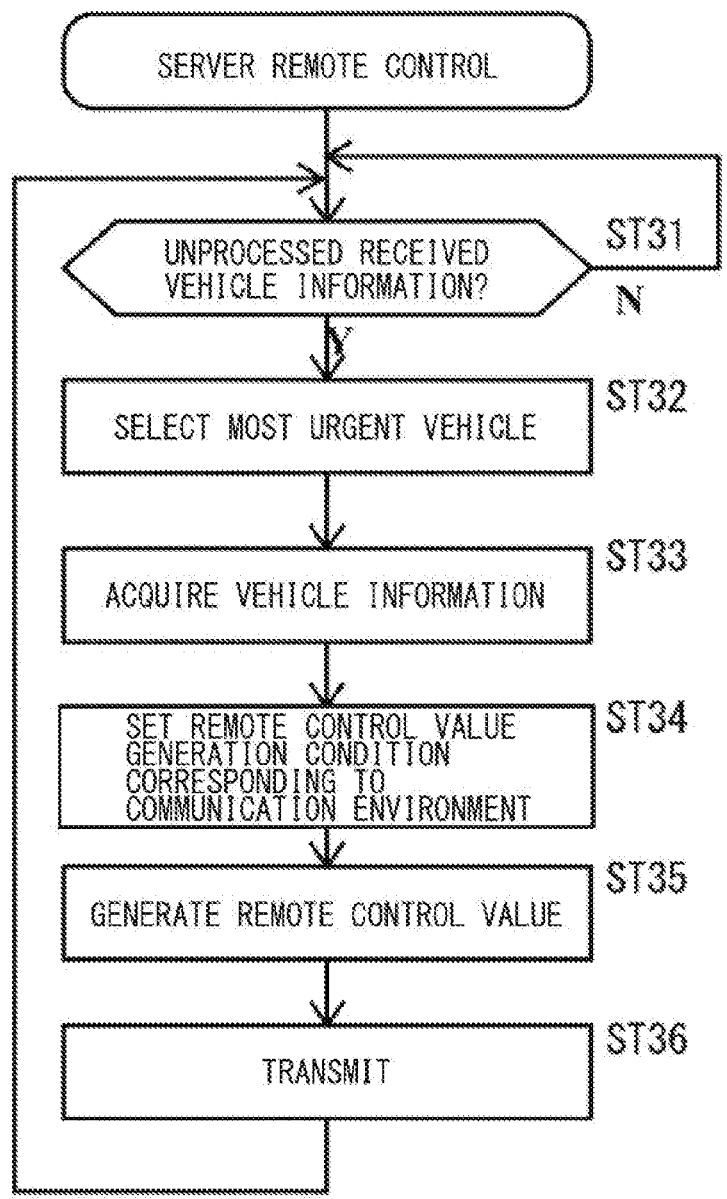
FIG. 8 is a flowchart illustrating remote control to be performed by the server of the remote control apparatus illustrated in FIG. 1.

FIG. 8 is a flowchart illustrating remote control to be performed by the server 5 of the remote control apparatus 4 illustrated in FIG. 1.

The server CPU 15 of the server 5 of the remote control apparatus 4 may repeat the remote control illustrated in FIG. 8.

In step ST31, the server CPU 15 of the server 5 of the remote control apparatus 4 may determine whether the unprocessed information list 70 held in the server memory 14 includes unprocessed received vehicle information. If unprocessed vehicle information is not included (ST31: N), the server CPU 15 may repeat this process. If unprocessed vehicle information is included (ST31: Y), the server CPU 15 may cause the flow to proceed to step ST32 to process the unprocessed vehicle information.

In step ST32, the server CPU 15 may select the most urgent vehicle information of the vehicle 2 closest to expiration in the unprocessed information list 70.

In step ST33, the server CPU 15 may acquire the vehicle information of the vehicle 2 selected in step ST32.

In step ST34, the server CPU 15 may set, for the remote control value generator 6, a remote control value generation condition corresponding to the communication environment.

The remote control value generator 6 may generate the remote control value by using the set remote control value generation condition. The remote control value generator 6 may generate the remote control value by different processes depending on a magnitude of communication delay of the vehicle information including the detection information and received by the remote control apparatus 4 from each vehicle 2.

The remote control value generator 6 may generate a steering remote control value for the lane keep control and an acceleration or deceleration remote control value for the inter-vehicle distance control, for example, as the remote control value available as it is to the vehicle 2 that has transmitted the vehicle information, by a process similar to the process to be performed by the traveling control ECU 24 of the vehicle 2. The remote control value generator 6 may output the generated remote control value to the server 5.

In step ST35, the server CPU 15 may acquire, from the remote control value generator 6, the remote control value generated by the remote control value generator 6.

In step ST36, the server CPU 15 may transmit the remote control value generated by the processes described above to the relevant vehicle 2 that has transmitted the vehicle information. The control system 3 of the vehicle 2 that has transmitted the vehicle information may be in a reception wait state for the remote control value in step ST4, after having transmitted the vehicle information in step ST3 of FIG. 5. The control system 3 of the vehicle 2 that has transmitted the vehicle information may execute the remote traveling control by using the remote control value received from the server 5 in step ST5.

Thereafter, the server CPU 15 may cause the flow to return to step ST31. The server CPU 15 of the server 5 of the remote control apparatus 4 may thus repeat the remote control illustrated in FIG. 8. This enables the server CPU 15 to keep generating and transmitting the remote control value corresponding to the latest traveling environment repeatedly, for each of the plurality of vehicles 2. The server CPU 15 may keep generating, for example, a steering amount remote control value for the lane keep control, and an acceleration or deceleration amount remote control value for the inter-vehicle distance control or vehicle speed control.

According to the unprocessed information list 70 in the state of FIG. 7, for example, the server CPU 15 may execute the control illustrated in FIG. 8 in order for the second record 72 from the top and the third record 73 from the top, because the first record 71 from the top does not include unprocessed vehicle information.

The server CPU 15 may process the second record 72 from the top and the third record 73 from the top in an order in which the vehicle information has been received.

Figure 9:
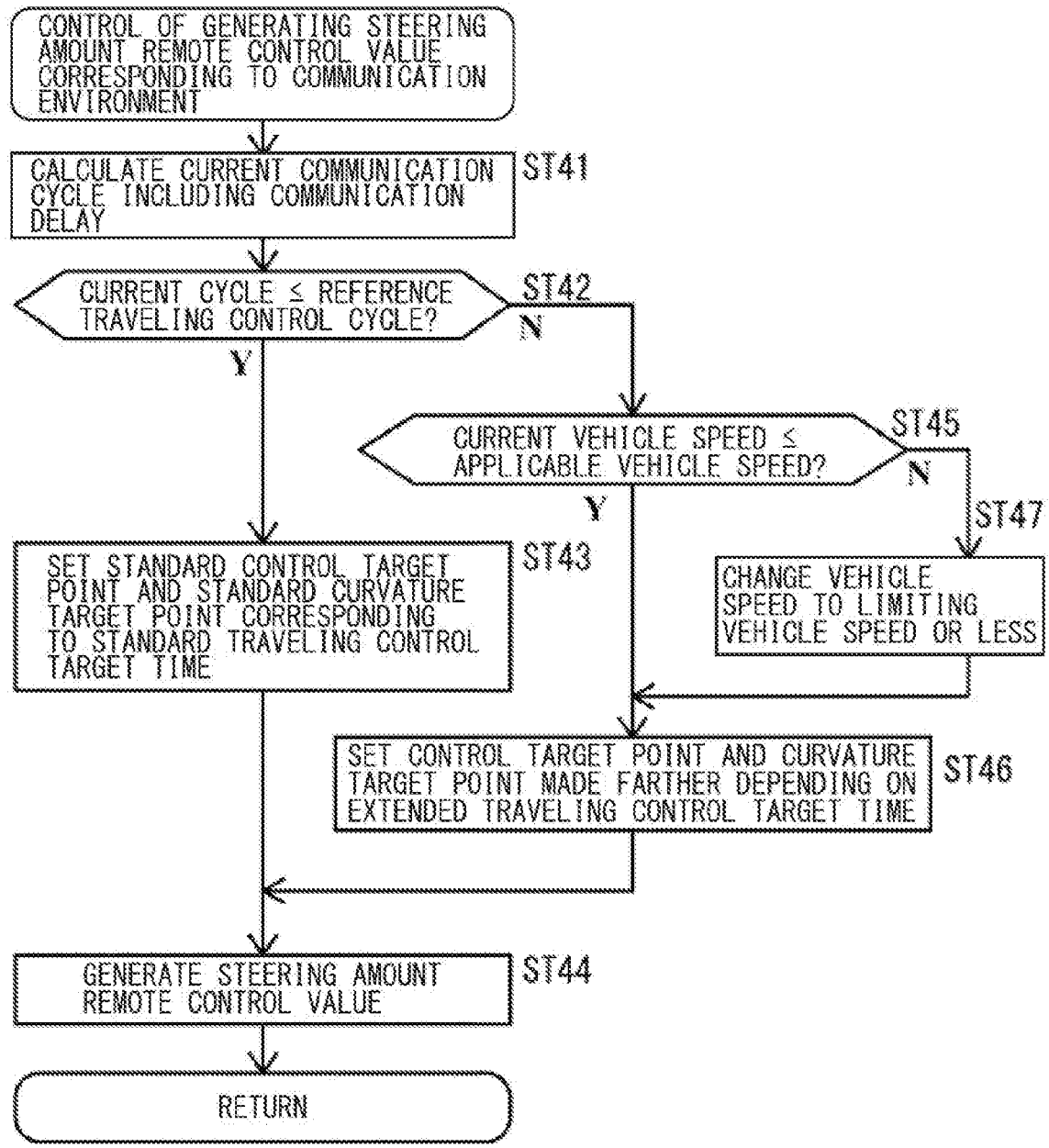
FIG. 9 is a flowchart illustrating control of generating a steering amount remote control value corresponding to a communication environment, to be performed by the server of the remote control apparatus illustrated in FIG. 1.

FIG. 9 is a flowchart illustrating control of generating the steering amount remote control value corresponding to the communication environment, to be performed by the server 5 of the remote control apparatus 4 illustrated in FIG. 1.

The server CPU 15 of the server 5 of the remote control apparatus 4 may execute the generation control illustrated in FIG. 9 in step ST34 and step ST35 of the remote control illustrated in FIG. 8.

By the generation control illustrated in FIG. 9, the server CPU 15 may basically generate the steering remote control value for traveling toward a steering control target point on the road. The steering control target point may become farther as the communication delay of the vehicle information including the detection information becomes larger.

In step ST41, the server CPU 15 of the server 5 of the remote control apparatus 4 may calculate the current communication cycle from the plurality of reception times of the record of the selected vehicle 2 in the unprocessed information list 70 of FIG. 7. The server CPU 15 is able to obtain the current reception cycle regarding the vehicle 2, for example, by subtracting the previous reception time from the latest reception time. The current reception cycle may correspond favorably to, for example, the transmission cycle, the generation cycle, and the traveling control cycle of the vehicle 2 illustrated in FIG. 4. These cycles may include a communication delay.

In step ST42, the server CPU 15 may determine whether the current communication cycle based on the reception of the vehicle information including the detection information is equal to or less than a reference traveling control cycle corresponding to the generation cycle in which the remote control apparatus 4 repeatedly generates the remote control value. The reference traveling control cycle may be the longest traveling control cycle in which it is possible to control the traveling favorably on the basis of the remote control value repeatedly acquired by the vehicle 2. The reference traveling control cycle may be a constant cycle for each vehicle 2, or may be changed depending on the traveling environment, for example. If the reference traveling control cycle is within several hundreds of milliseconds, the vehicle 2 is expected to be basically able to control its traveling favorably.

If the current communication cycle is equal to or less than the reference traveling control cycle (ST42: Y), the server CPU 15 may cause the flow to proceed to step ST43.

If the current communication cycle is not equal to or less than the reference traveling control cycle (ST42: N), the server CPU 15 may cause the flow to proceed to step ST45.

In step ST43, the server CPU 15 may output and set, for the remote control value generator 6, for example, a standard control target point and a standard curvature target point in traveling control target time for steering. In this case, on the basis of the setting, the remote control value generator 6 may generate the steering amount (i.e., steering angle) remote control value for traveling toward the steering control target point in the traveling control target time.

In step ST44, the server CPU 15 may acquire, from the remote control value generator 6, the steering amount remote control value generated by the remote control value generator 6.

In a case where the current communication cycle is equal to or less than the reference traveling control cycle, the server CPU 15 may thus generate, by means of the remote control value generator 6, the steering amount remote control value for traveling toward the standard control target point in the time of the reference traveling control cycle.

Thereafter, the server CPU 15 may cause the flow to return to the remote control illustrated in FIG. 8.

Step ST45 may be a process that is executed in a case where the current communication cycle is not equal to or less than the reference traveling control cycle. The server CPU 15 may determine whether the current vehicle speed of the selected vehicle 2 is equal to or less than a vehicle speed applicable to the remote control value generator 6. The server CPU 15 may basically determine whether the current vehicle speed of the selected vehicle 2 is equal to or less than the vehicle speed applicable to the remote control value generator 6 on the basis of whether the remote control value generator 6 is able to generate the remote control value under the vehicle speed.

If the current vehicle speed is equal to or less than the applicable vehicle speed (ST45: Y), the server CPU 15 may cause the flow to proceed to step ST46.

If the current vehicle speed is not equal to or less than the applicable vehicle speed (ST45: N), the server CPU 15 may cause the flow to proceed to step ST47.

In step ST46, the server CPU 15 may generate the steering control target point and the curvature target point that become farther depending on a magnitude of a cycle time difference between the current communication cycle of the vehicle information and the reference traveling control cycle, and set the steering control target point and the curvature target point for the remote control value generator 6. In this case, on the basis of the setting, the remote control value generator 6 may generate the steering amount remote control value for traveling, at the vehicle speed applicable to the remote control value generator 6, toward the steering control target point that becomes farther depending on the magnitude of the cycle time difference.

Thereafter, the server CPU 15 may cause the flow to proceed to step ST44, and acquire, from the remote control value generator 6, the steering amount remote control value generated by the remote control value generator 6.

In a case where the current communication cycle is not equal to or less than the reference traveling control cycle and where the current vehicle speed is equal to or less than the applicable vehicle speed, the server CPU 15 may thus generate, by means of the remote control value generator 6, the steering amount remote control value for traveling toward the steering control target point that becomes farther depending on the magnitude of the cycle time difference.

Thereafter, the server CPU 15 may cause the flow to return to the remote control illustrated in FIG. 8.

In step ST47, because the current vehicle speed of the selected vehicle 2 is not the applicable vehicle speed, the server CPU 15 may change the vehicle speed of the selected vehicle 2 to a speed equal to or less than a limiting vehicle speed applicable to the remote control value generator 6. The limiting vehicle speed may basically become lower as the communication cycle of the vehicle information becomes longer, i.e., increases.

Thereafter, the server CPU 15 may cause the flow to proceed to step ST46, and set, for the remote control value generator 6, the steering control target point and the curvature target point that become farther depending on the magnitude of the cycle time difference between the current communication cycle of the vehicle information and the reference traveling control cycle. In this case, on the basis of the setting, the remote control value generator 6 may generate the steering amount remote control value for traveling, at the speed equal to or less than the limiting vehicle speed, toward the steering control target point that becomes farther depending on the magnitude of the cycle time difference.

Thereafter, the server CPU 15 may cause the flow to proceed to step ST44, and acquire, from the remote control value generator 6, the steering amount remote control value generated by the remote control value generator 6.

In a case where the current communication cycle is not equal to or less than the reference traveling control cycle and where the current vehicle speed is not equal to or less than the applicable vehicle speed, the server CPU 15 may thus generate, by means of the remote control value generator 6, the steering amount remote control value for traveling, at the speed equal to or less than the applicable limiting vehicle speed, toward the steering control target point that becomes farther depending on the magnitude of the cycle time difference.

Thereafter, the server CPU 15 may cause the flow to return to the remote control illustrated in FIG. 8.

Figure 10:
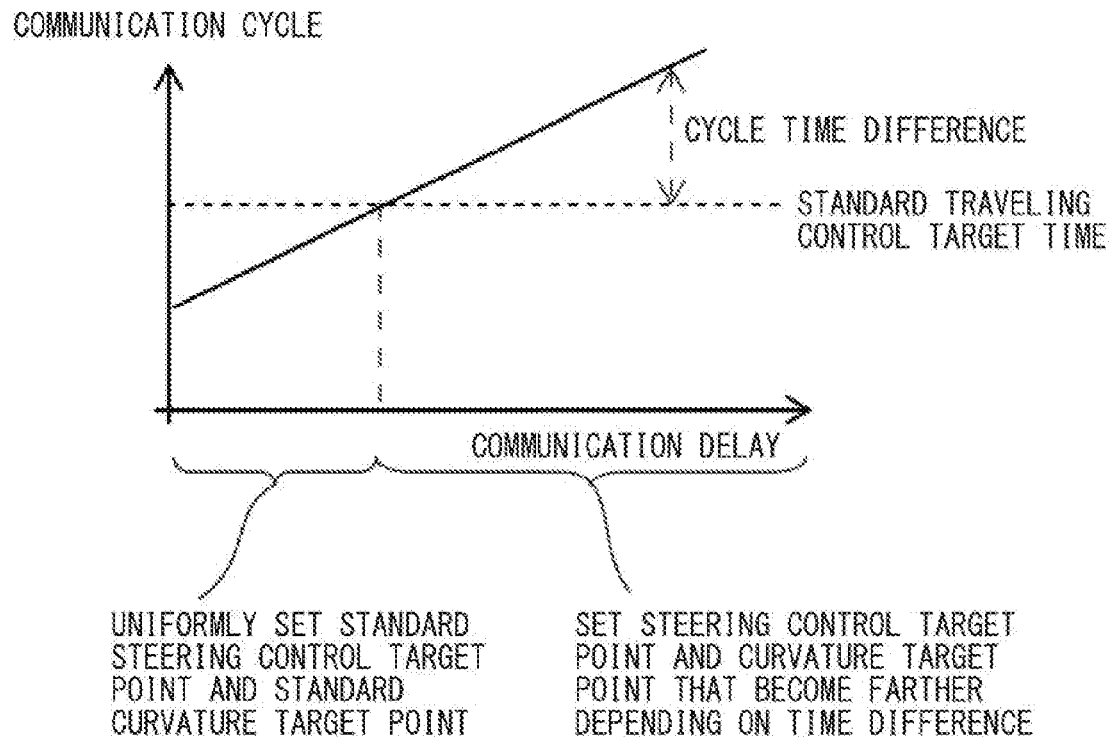
FIG. 10 is an explanatory diagram illustrating a relationship between a communication delay between the vehicle and the remote control apparatus and a communication cycle corresponding to the communication delay.

FIG. 10 is an explanatory diagram illustrating a relationship between a communication delay between the vehicle 2 and the remote control apparatus 4 and a communication cycle corresponding to the communication delay.

In FIG. 10, the horizontal axis may represent the communication delay. The vertical axis may represent the communication cycle. The communication cycle may correspond favorably to the traveling control cycle.

As indicated by an inclined solid line in FIG. 10, the communication cycle may increase in proportion to the communication delay as the communication delay becomes larger.

A horizontal dashed line in FIG. 10 may represent standard traveling control target time. The standard traveling control target time may be set to, for example, several times to several tens of times the reference traveling control cycle. The standard traveling control target time may be made to match the reference traveling control cycle. The standard traveling control target time illustrated in FIG. 10 may be assumed to match the reference traveling control cycle.

The standard steering control target point and the standard curvature target point in the standard traveling control target time may be used in a communication delay range in which the communication cycle is equal to or less than the standard traveling control target time.

In contrast, the steering control target point and the curvature target point that become farther depending on a magnitude of the time difference between the communication cycle and the reference traveling control cycle may be used in a communication delay range in which the communication cycle is longer than the standard traveling control target time.

Figure 11:
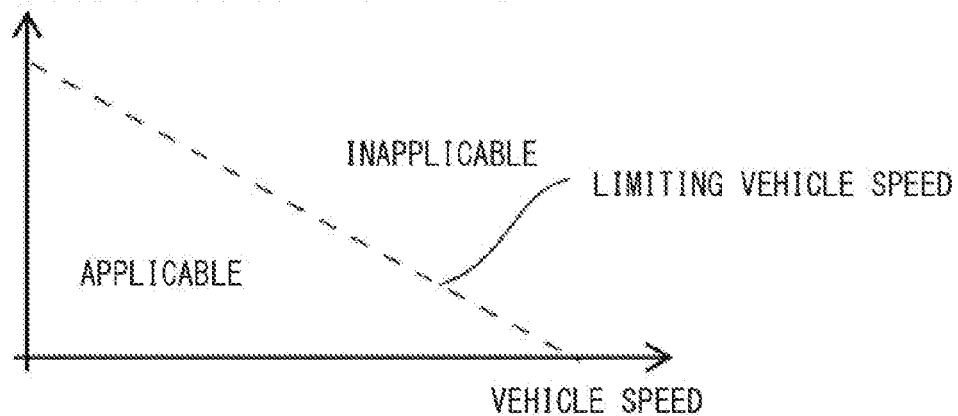
FIG. 11 is an explanatory diagram illustrating a relationship between an amount of delay corresponding to an amount of increase in the communication cycle and an applicable vehicle speed.

FIG. 11 is an explanatory diagram illustrating a relationship between an amount of delay corresponding to an amount of increase in the communication cycle and the applicable vehicle speed.

In FIG. 11, the horizontal axis may represent the vehicle speed. The vertical axis may represent the amount of delay corresponding to the amount of increase.

A declining dashed line in FIG. 11 may represent the boundary between the applicable vehicle speed and an inapplicable vehicle speed. The vehicle speed not exceeding the boundary may be applicable. The boundary may thus indicate the limiting vehicle speed.

As illustrated in FIG. 11, as the amount of delay corresponding to the amount of increase becomes larger, a larger proportion of the standard traveling control target time may be occupied by communication, resulting in a decrease in the applicable vehicle speed.

The server CPU 15 may select, in step ST47, any speed not exceeding the boundary of the limiting vehicle speed in FIG. 11. However, to suppress a deceleration amount from the current speed, the limiting vehicle speed itself on the boundary may be selected.

The server CPU 15 may thus acquire the limiting vehicle speed that becomes smaller as the amount of increase in the communication cycle of the vehicle information becomes larger, on the basis of the relationship between the amount of increase and the vehicle speed applicable to the remote control value generator 6 for each amount of increase.

Figure 12:
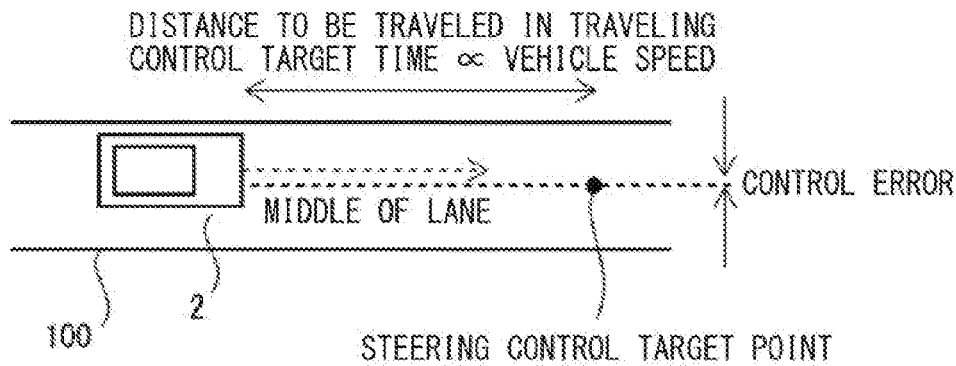
FIG. 12 is an explanatory diagram illustrating examples of setting for obtaining the steering amount remote control value.
Figure 12:
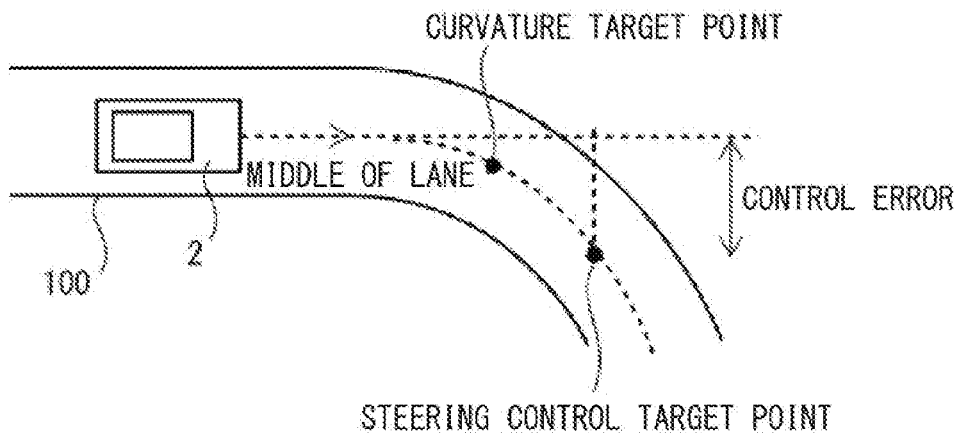
Figure 12:
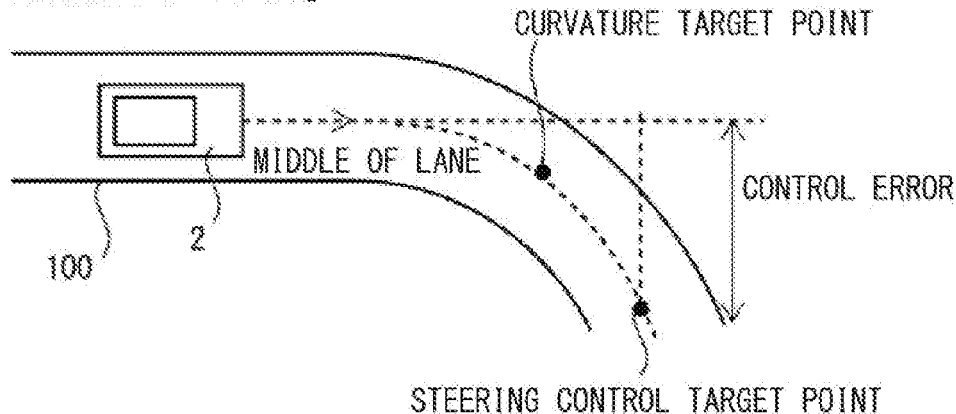

FIG. 12 is an explanatory diagram illustrating examples of setting for obtaining the steering amount remote control value.

FIG. 12 illustrates three cases.

Case 1 may be a setting example in a case where the current cycle is equal to or less than the standard traveling control target time. In case 1, the vehicle 2 may be traveling on the straight road 100 along the lane.

In this case, the server CPU 15 may set the steering control target point on the road 100 at a distance to be traveled in the standard traveling control target time from the current position of the vehicle 2. The steering control target point may be set at the middle of the lane on which the vehicle 2 is traveling on the road 100, by using the high-precision map data, for example.

On the basis of such setting, the remote control value generator 6 may generate the steering amount remote control value for the vehicle 2. The remote control value generator 6 may generate the steering amount remote control value for traveling from the current position of the vehicle 2 toward the control target point by performing small steering to suppress a control error. This enables the vehicle 2 to travel along the middle of the lane of the road 100 on the basis of remote lane keep control.

Case 2 may be a setting example in a case where the current cycle is equal to or less than the standard traveling control target time. In case 2, the vehicle 2 may be traveling to enter a corner from a straight part of the road 100.

In this case, the server CPU 15 may set the steering control target point on the road 100 at the distance to be traveled in the standard traveling control target time from the current position of the vehicle 2. The steering control target point may be set at the middle of the lane on which the vehicle 2 is traveling, near an entrance of the corner on the road 100, by using the high-precision map data, for example. In this case, the distance to be traveled may be the distance at the middle of the curved lane.

In addition, the server CPU 15 may set the curvature target point at the middle of the lane between the current position of the vehicle 2 and the steering control target point. The curvature target point may serve as, for example, an intermediate target point to be used to allow the vehicle 2 to travel with a steering amount based on a remote control value at the steering control target point. The vehicle 2 is able to travel with the steering amount based on the remote control value at the control target point by, for example, starting to travel with the steering amount based on the remote control value from the curvature target point.

On the basis of such setting, the remote control value generator 6 may generate the steering amount remote control value for the vehicle 2. The remote control value generator 6 may generate the steering amount remote control value for traveling from the current position of the vehicle 2 toward the control target point through the curvature target point by relatively large steering. This enables the vehicle 2 to travel along the middle of the lane of the road 100 in entering the corner from the straight part of the road 100, on the basis of the remote lane keep control.

Case 3 may be a setting example in a case where the current cycle is longer than the standard traveling control target time. The vehicle 2 may be traveling to enter a corner from a straight part of the road 100, as in case 2.

In this case, the server CPU 15 may set, with reference to the current position of the vehicle 2, the steering control target point that becomes farther as the communication delay of the vehicle information including the detection information becomes larger. The steering control target point may be set at the middle of the lane on which the vehicle 2 is traveling, near an entrance of the corner on the road 100, by using the high-precision map data, for example. The steering control target point in this case may be farther from the current position of the vehicle 2 than in case 2, resulting in a larger control error.

In addition, the server CPU 15 may set the curvature target point at the middle of the lane between the current position of the vehicle 2 and the steering control target point. The curvature target point may serve as, for example, an intermediate target point to be used to allow the vehicle 2 to travel with a steering amount based on a remote control value at the steering control target point. The vehicle 2 is able to travel with the steering amount based on the remote control value at the control target point by, for example, starting to travel with the steering amount based on the remote control value from the curvature target point. The curvature target point in this case may be, as with the control target point, set farther as the communication delay of the vehicle information including the detection information becomes larger, and may be farther from the current position of the vehicle 2 than in case 2.

On the basis of such setting, the remote control value generator 6 may generate the steering amount remote control value for the vehicle 2. The remote control value generator 6 may generate the steering amount remote control value for traveling from the current position of the vehicle 2 toward the control target point through the curvature target point by relatively large steering. This enables the vehicle 2 to, even in a case where the current cycle is longer than the standard traveling control target time, travel along the middle of the lane of the road 100 in entering the corner from the straight part of the road 100, on the basis of the remote lane keep control.

The server CPU 15 may set, for the remote control value generator 6, information such as the speed to be used for the control or the road shape based on the high-precision map data, in addition to the steering control target point and the curvature target point described above. The speed to be used for the control may be the current vehicle speed or the limiting vehicle speed.

Figure 13:
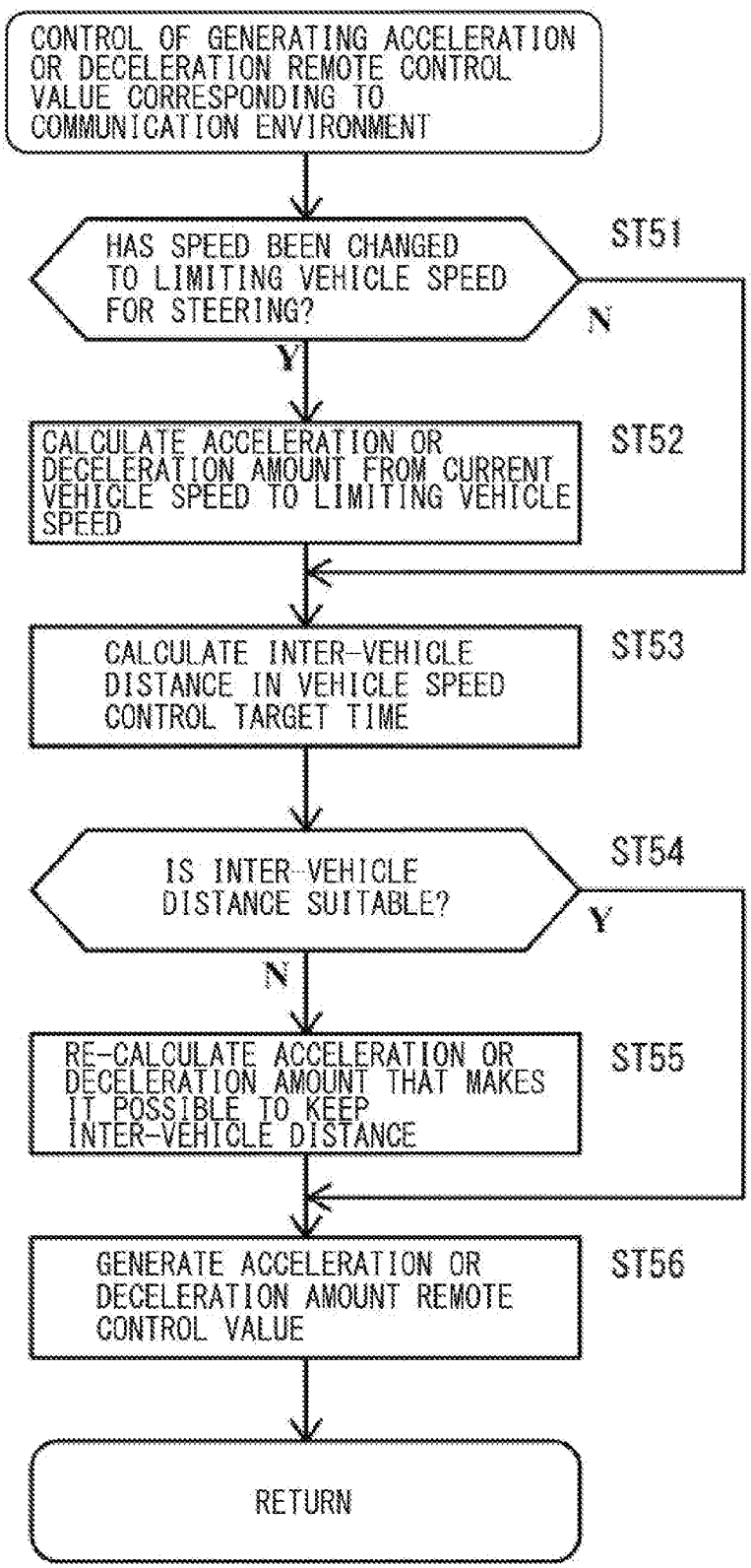
FIG. 13 is a flowchart illustrating control of generating an acceleration or deceleration remote control value corresponding to the communication environment, to be performed by the server of the remote control apparatus illustrated in FIG. 1.

FIG. 13 is a flowchart illustrating control of generating the acceleration or deceleration remote control value corresponding to the communication environment, to be performed by the server 5 of the remote control apparatus 4 illustrated in FIG. 1.

In step ST34 and step ST35 of the remote control illustrated in FIG. 8, the server CPU 15 of the server 5 of the remote control apparatus 4 may execute the acceleration or deceleration remote control value generation control illustrated in FIG. 13 after the steering amount remote control value generation control illustrated in FIG. 9.

By the generation control illustrated in FIG. 13, the server CPU 15 may basically generate the acceleration or deceleration remote control value that makes it possible to keep the inter-vehicle distance in the time of the communication cycle that becomes longer as the communication delay of the vehicle information including the detection information becomes larger.

In step ST51, the server CPU 15 of the server 5 of the remote control apparatus 4 may determine whether the speed has been changed to the limiting vehicle speed for steering. In the steering amount remote control value generation control illustrated in FIG. 9, the speed may be changed in step ST47. If the process of step ST47 has been executed, the server CPU 15 may determine that the speed has been changed to the limiting vehicle speed for steering (ST51: Y), and cause the flow to proceed to step ST52. If the speed has not been changed to the limiting vehicle speed for steering (ST51: N), the server CPU 15 may cause the flow to proceed to step ST53, skipping the process of step ST52.

In step ST52, the server CPU 15 may calculate an acceleration or deceleration amount for acceleration or deceleration from the current vehicle speed to the limiting vehicle speed.

In step ST53, the server CPU 15 may calculate the inter-vehicle distance between the vehicle 2 and the preceding vehicle 101 in preset vehicle speed control target time for acceleration or deceleration. The vehicle speed control target time may be an example of the traveling control target time. The vehicle speed control target time may match or may be different from the standard traveling control target time for steering described above. In a case where the lane keep control and the inter-vehicle distance control are implemented independently of each other, for example, the traveling control target time for steering and the traveling control target time for acceleration or deceleration may be different from each other.

In step ST54, the server CPU 15 may determine whether the inter-vehicle distance between the vehicle 2 and the preceding vehicle 101 at the control target point in the vehicle speed control target time is equal to or greater than an inter-vehicle distance suitable for the speed, i.e., the current vehicle speed or the limiting vehicle speed. The inter-vehicle distance suitable for the speed to be used in this determination may not simply be, for example, the inter-vehicle distance corresponding to the vehicle speed. Instead, the inter-vehicle distance suitable for the speed may be the inter-vehicle distance corresponding to the vehicle speed to which a travel distance is added. The travel distance may correspond to predicted time based on a control delay that can occur in the actual cycle and to a relative speed, i.e., a speed difference between the vehicle 2 and the preceding vehicle 101. This predicted time based on the control delay that can occur in the actual cycle may be time to be taken for the vehicle 2 to arrive at the steering control target point set for the steering remote control value by traveling at the current vehicle speed or the limiting vehicle speed. The predicted time may include time obtained on the basis of another factor.

If the calculated inter-vehicle distance between the vehicle 2 and the preceding vehicle 101 at the steering control target point is not equal to or greater than the inter-vehicle distance suitable for the speed (ST54: N), the server CPU 15 may cause the flow to proceed to step ST55.

If the calculated inter-vehicle distance between the vehicle 2 and the preceding vehicle 101 at the steering control target point is equal to or greater than the inter-vehicle distance suitable for the speed (ST54: Y), the server CPU 15 may cause the flow to proceed to step ST56, skipping the process of step ST55.

In step ST55, the server CPU 15 may acquire a speed that makes it possible to keep the inter-vehicle distance between the vehicle 2 and the preceding vehicle 101 at the control target point in the vehicle speed control target time, and re-calculate the acceleration or deceleration amount for acceleration or deceleration to the acquired speed.

In step ST56, the server CPU 15 may generate the remote control value for the acceleration or deceleration amount finally generated in step ST55 or step ST52.

In a case where, for example, the acceleration or deceleration amount generated in step ST55 and the acceleration or deceleration amount generated in step ST52 are both an acceleration or deceleration amount for deceleration, the server CPU 15 may select the larger acceleration or deceleration amount.

Thereafter, the server CPU 15 may cause the flow to return to the remote control illustrated in FIG. 8.

The server CPU 15 may thus execute the steering amount remote control value generation control illustrated in FIG. 9 and the acceleration or deceleration remote control value generation control illustrated in FIG. 13. This enables the remote control apparatus 4 to generate and acquire the steering amount remote control value for remote lane keep control and the acceleration or deceleration remote control value for remote inter-vehicle distance control.

As described above, in the example embodiment, the remote control apparatus 4 receives the vehicle information including the detection information detected by each of the plurality of vehicles 2. In the remote control apparatus 4, the remote control value generator 6 repeatedly generates, for each vehicle 2, the remote control value available for the traveling control of each vehicle 2, on the basis of the detection information of each vehicle 2 acquired by communication. The remote control value generator 6 generates the remote control value by different processes depending on the magnitude of the communication delay of the vehicle information including the detection information and received by the remote control apparatus 4 from each vehicle 2.

Thus, even if a delay occurs in communication with the remote control apparatus 4, the traveling control ECU 24 is able to acquire the remote control value generated by different processes depending on the communication delay, and execute the traveling control that makes it possible to suppress the influence of the communication delay. The traveling control ECU 24 may serve as the traveling control unit that executes the traveling control on the basis of the remote control value repeatedly received from the remote control apparatus 4.

Consequently, the vehicle 2 whose traveling is controlled by the remote control system 1 for the traveling of the vehicle 2 is able to reduce the possibility of becoming unable to control the traveling of the own vehicle appropriately in the remote control.

Second Example Embodiment

Described next is the remote control system 1 for the traveling of the vehicle 2 according to a second example embodiment of the technology. In the remote control system 1 according to the example embodiment, the server 5 of the remote control apparatus 4 may be configured to request each vehicle 2 to switch the traveling control cycle under the remote control. Mainly described below are differences from the example embodiments described above.

Figure 14:
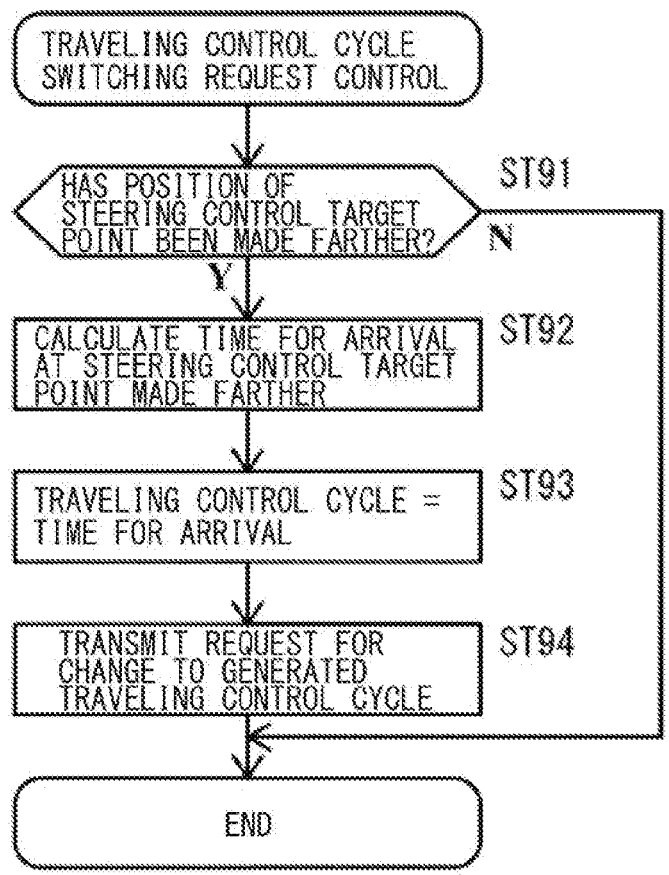
FIG. 14 is a flowchart illustrating traveling control cycle switching request control to be performed by the server of the remote control apparatus of the remote control system for the traveling of the vehicle, according to one example embodiment of the technology.

FIG. 14 is a flowchart illustrating traveling control cycle switching request control to be performed by the server 5 of the remote control apparatus 4 of the remote control system 1 for the traveling of the vehicle 2, according to the second example embodiment of the technology.

The server CPU 15 of the server 5 of the remote control apparatus 4 may repeatedly execute the traveling control cycle switching request control illustrated in FIG. 14.

In step ST91, the server CPU 15 may determine whether, as the remote control value generation condition corresponding to the communication environment in step ST34 of FIG. 8, the position of the steering control target point has been set at a position farther than a standard position corresponding to the standard traveling control target time, instead of the standard position. In step ST46 of FIG. 9, for example, the server CPU 15 may set the steering control target point and the curvature target point at positions made farther depending on the magnitude of the cycle time difference between the current communication cycle including a communication delay and the standard traveling control target time.

If the steering control target point has been set farther than the standard position (ST91: Y), the server CPU 15 may cause the flow to proceed to step ST92.

If the steering control target point has not been set farther than the standard position, i.e., has been set at the standard position (ST91: N), the server CPU 15 may end this control.

In step ST92, the server CPU 15 may calculate time for arrival at the steering control target point made farther. Case 3 illustrated in FIG. 12 may be an example in which the steering control target point is made farther. In case 3, for example, the server CPU 15 may calculate, as the time for arrival, time taken for the traveling vehicle 2 to travel to the steering control target point. The speed of the vehicle 2 to be used for the calculation may be the current speed, for example.

In step ST93, the server CPU 15 may set the time for arrival calculated in step ST92 as the traveling control cycle to be transmitted to and requested of the vehicle 2.

Note that the server CPU 15 may set, as the traveling control cycle to be requested, the time for arrival calculated in step ST92 to which a margin is added.

In step ST94, the server CPU 15 may transmit a request for change to the generated traveling control cycle to the vehicle 2. Thereafter, the server CPU 15 may end this control.

As described above, in a case where the communication cycle of the vehicle information including the detection information becomes longer than the standard traveling control target time corresponding to the generation cycle, and the steering control target point to be set for the remote control value generator 6 is made farther depending on the magnitude of the cycle time difference, the server 5 of the remote control apparatus 4 may request each vehicle 2 to execute the traveling control in a cycle corresponding to the steering control target point made farther.

Figure 15:
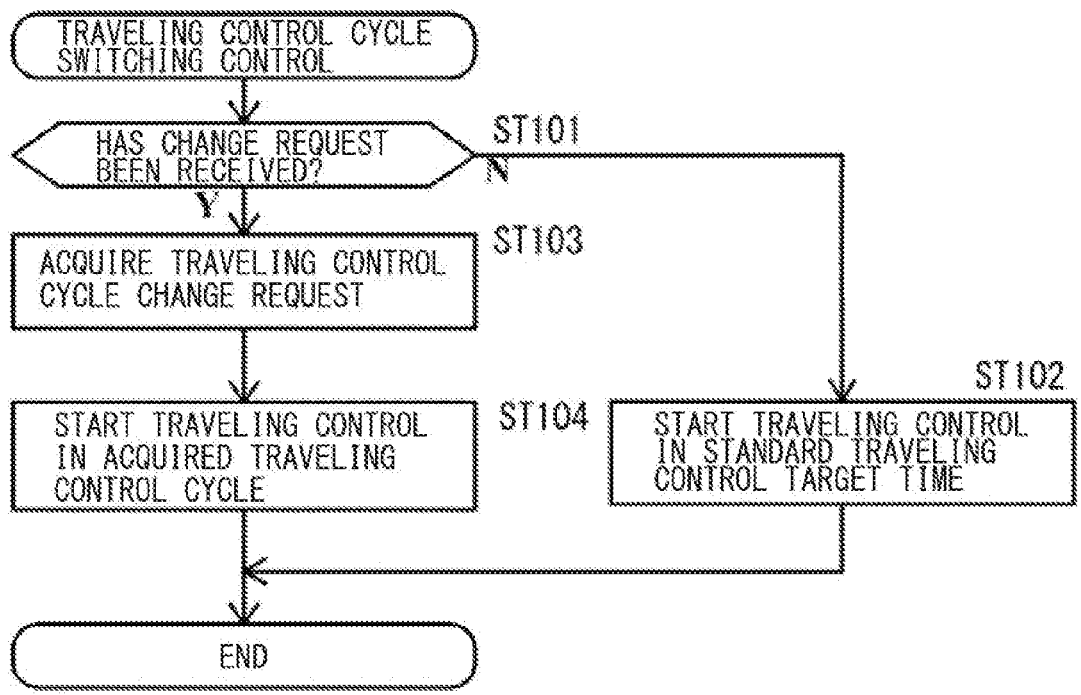
FIG. 15 is a flowchart illustrating traveling control cycle switching control to be performed by the control system of the vehicle.

FIG. 15 is a flowchart illustrating traveling control cycle switching control to be performed by the control system 3 of the vehicle 2.

The traveling control ECU 24 of the control system 3 of the vehicle 2 may repeatedly execute the traveling control cycle switching control illustrated in FIG. 15.

In step ST101, the traveling control ECU 24 may determine whether a traveling control cycle change request has been received from the server 5 of the remote control apparatus 4.

If a traveling control cycle change request has not been received (ST101: N), the traveling control ECU 24 may cause the flow to proceed to step ST102.

If a traveling control cycle change request has been received (ST101: Y), the traveling control ECU 24 may cause the flow to proceed to step ST103.

In step ST102, the traveling control ECU 24 may start the traveling control in the standard traveling control target time as usual. The traveling control ECU 24 may repeat the following: acquiring and transmitting the vehicle information to the server 5 of the remote control apparatus 4 and controlling the traveling of the own vehicle on the basis of the remote control value received from the server 5 in the standard traveling control target time. Thereafter, the traveling control ECU 24 may end this control.

In step ST103, the traveling control ECU 24 may acquire the traveling control cycle change request received from the server 5 of the remote control apparatus 4.

In step ST104, the traveling control ECU 24 may start the traveling control in the traveling control cycle requested by the server 5 of the remote control apparatus 4. The traveling control ECU 24 may repeat, in the traveling control cycle requested by the server 5, acquiring and transmitting the vehicle information to the server 5 of the remote control apparatus 4 and controlling the traveling of the own vehicle on the basis of the remote control value received from the server 5. Thereafter, the traveling control ECU 24 may end this control.

As described above, in a case where communication is delayed, the server 5 of the remote control apparatus 4 according to the example embodiment may request each vehicle 2 to execute the traveling control in a cycle extended from the standard traveling control target time by an amount of the communication delay or greater, to adapt to the steering control target point made farther to adapt to the communication delay.

Even in a case where the vehicle 2 executes the traveling control in the cycle requested by the server 5 of the remote control apparatus 4, the vehicle 2 is able to repeat the traveling control on the basis of the remote control value repeatedly received from the remote control apparatus 4, as in a case of executing the traveling control in the standard traveling control target time.

Moreover, the remote control apparatus 4 and the vehicle 2 are able to synchronously execute the generation of the remote control value and the traveling control based on the remote control value in the cycle extended to adapt favorably, as in a case where the remote control apparatus 4 and the vehicle 2 operate in the standard traveling control target time.

Third Example Embodiment

Described next is the remote control system 1 for the traveling of the vehicle 2 according to a third example embodiment of the technology. The remote control system 1 according to the example embodiment may be configured to switch between and provide, to the vehicle 2, the remote control value to be used for the remote control and the traveling control information available for the own vehicle control. Mainly described below are differences from the example embodiments described above.

Figure 16:
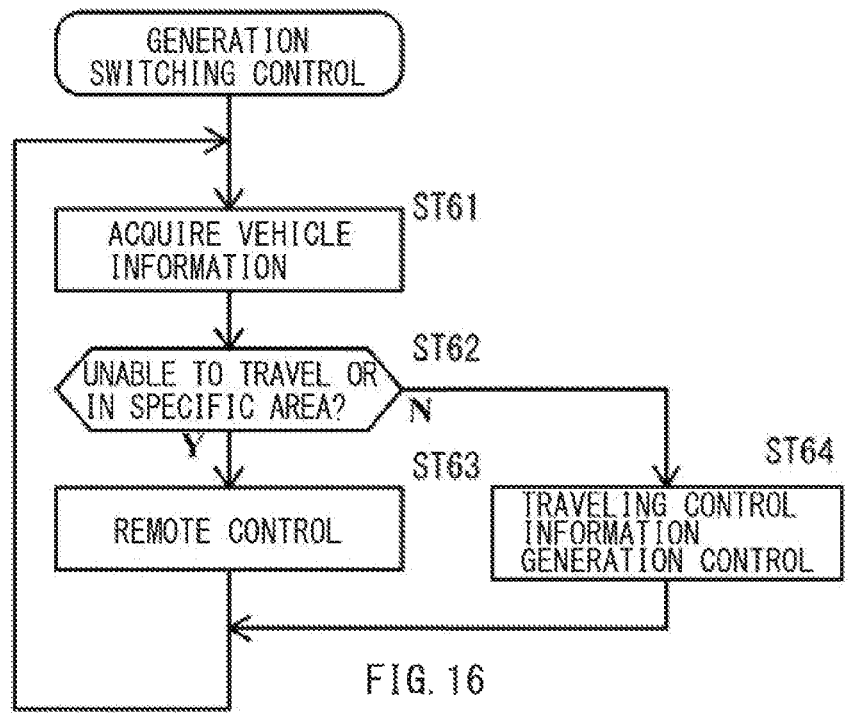
FIG. 16 is a flowchart illustrating generation switching control to be performed by the server of the remote control apparatus of the remote control system for the traveling of the vehicle, according to one example embodiment of the technology.

FIG. 16 is a flowchart illustrating generation switching control to be performed by the server 5 of the remote control apparatus 4 of the remote control system 1 for the traveling of the vehicle 2, according to the third example embodiment of the technology.

The server CPU 15 of the server 5 of the remote control apparatus 4 may continuously execute the switching control illustrated in FIG. 16 to provide the remote control value or the traveling control information to each of the plurality of vehicles 2.

In step ST61, the server CPU 15 may acquire unprocessed vehicle information from, for example, the unprocessed information list 70 held in the server memory 14. The server CPU 15 may select the most urgent vehicle information of the vehicle 2 closest to expiration in the unprocessed information list 70, as in step ST32.

In step ST62, the server CPU 15 may first determine whether the vehicle 2 whose vehicle information has been acquired is in a state of being unable to travel.

In the vehicle 2, in a case where a malfunction occurs in the traveling control ECU 24 serving as the own vehicle control value generating unit, for example, it can become difficult to generate, in an appropriate cycle, the control value for automatic driving by the own vehicle. Generating the control value for automatic driving is assumed to be high-load processing.

Even in the vehicle 2 under manual driving, in a case where a trouble involving the occupant, such as a driver who drives the vehicle 2, occurs, it can become difficult for the traveling control ECU 24 to generate the own vehicle control value on the basis of a manual operation.

In a case where such a state of being unable to travel occurs, the traveling control ECU 24 may include the inability state in the vehicle information, and transmit the vehicle information to the server 5 of the remote control apparatus 4.

The server CPU 15 may determine such an inability state on its own on the basis of the captured image of the vehicle inside camera 65, for example, included in the vehicle information acquired from the vehicle 2.

The server CPU 15 may, in step ST62, further determine another state as well, instead of determining only that the vehicle 2 whose vehicle information has been acquired is in a state of being unable to travel.

The server CPU 15 may determine, for example, whether an area in which the vehicle 2 whose vehicle information has been acquired is traveling is a specific area set to prioritize the remote control.

The specific area may be set, for example, for a place where remote traveling control is able to achieve lower accident risk than autonomous traveling control. In one example, it is assumable that the specific area is set for a low-visibility intersection, an automatic parking area, or a place whose infrastructure information is available only to a server, for example.

Note that the server CPU 15 may determine only one of the state of being unable to travel or the specific area in step ST62.

The server CPU 15 may determine a traveling situation of the vehicle 2 other than the specific area described above. Non-limiting examples of the traveling situation of the vehicle 2 other than the specific area may include a case where a traffic light is present in the traveling direction, a case where the vehicle 2 travels toward an entrance or an exit of a curve, a case where the vehicle 2 travels in a merging section, and a case where the vehicle 2 travels toward an intersection. The server CPU 15 may determine a traveling situation of the vehicle 2 that changes dynamically. Non-limiting examples of the traveling situation of the vehicle 2 that changes dynamically may include a case where a preceding vehicle decelerates and a case where crosswind blows.

If the vehicle 2 whose vehicle information has been acquired is in a state of being unable to travel or is traveling in the specific area (ST62: Y), the server CPU 15 may cause the flow to proceed to step ST63 for the remote control.

If the vehicle 2 whose vehicle information has been acquired is not in a state of being unable to travel and is not traveling in the specific area (ST62: N), the server CPU 15 may cause the flow to proceed to step ST64 to assist autonomous control of the own vehicle.

In step ST63, the server CPU 15 may execute the remote control. The server CPU 15 may execute the processes of, for example, step ST34 to step ST36 in FIG. 8, and transmit the generated remote control value to the vehicle 2 that has transmitted the vehicle information. The server CPU 15 may execute the server remote control illustrated in FIG. 8 as a part of the switching control illustrated in FIG. 16. For the vehicle 2 whose inability has been determined, the remote control value generator 6 may generate the remote control value to be used for the traveling control of the vehicle 2. Thereafter, the server CPU 15 may cause the flow to return to step ST61.

This remote control may be executed by the server CPU 15, because the vehicle 2 is in a state of being unable to travel. The server CPU 15 may generate the remote control value to be used to guide the vehicle 2 in a state of being unable to travel. The remote control value may cause the vehicle 2 to stop on the road 100 on which the vehicle 2 is traveling, to pull over to a road shoulder and stop, or move to a first-aid facility such as a hospital.

In step ST64, the server CPU 15 may execute control of generating the traveling control information available for the traveling control ECU 24 of the vehicle 2 to generate the own vehicle control value. Thereafter, the server CPU 15 may cause the flow to return to step ST61.

As described above, the server CPU 15 of the server 5 of the remote control apparatus 4 may execute a generation process for each vehicle 2, by switching between remote control value generation control and traveling control information generation control, depending on whether the vehicle 2 is in a state of being unable to travel. In a case where inability regarding each vehicle 2 is determined, the server CPU 15 may switch the generation process for the vehicle 2 from the traveling control information generation control to the remote control value generation control. In one embodiment, the server CPU 15 may serve as a "traveling control information generating unit". In one embodiment, the server CPU 15 may serve as a "switching control unit".

Figure 17:
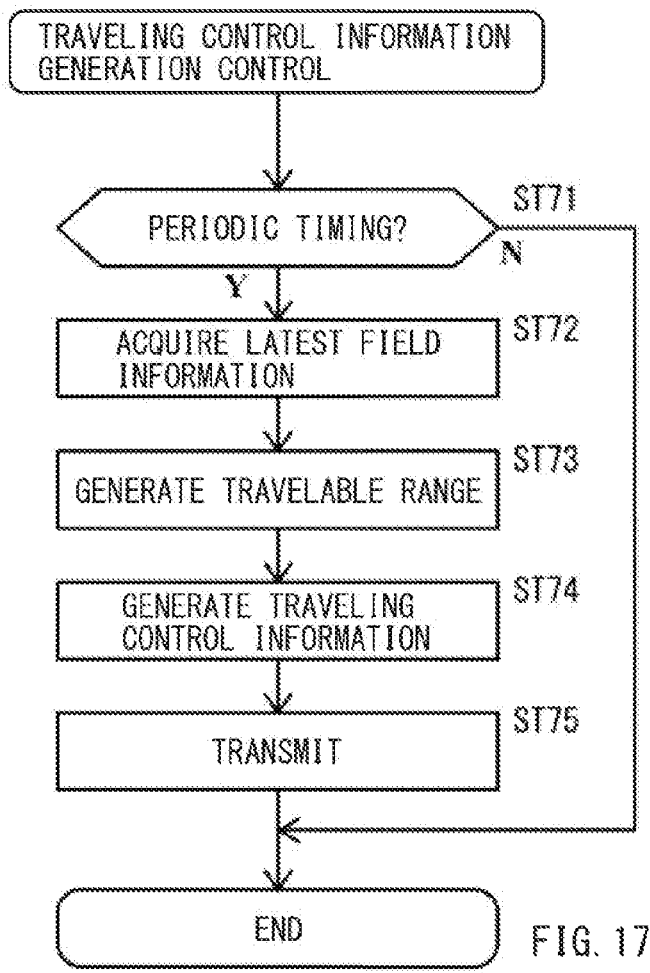
FIG. 17 is a flowchart illustrating traveling control information generation control to be performed by the server of the remote control apparatus.

FIG. 17 is a flowchart illustrating the traveling control information generation control to be performed by the server 5 of the remote control apparatus 4.

The server CPU 15 of the server 5 of the remote control apparatus 4 may repeatedly execute the traveling control information generation control illustrated in FIG. 17, for the plurality of vehicles 2 for which the traveling control information is to be generated by the remote control apparatus 4.

The vehicle 2 relevant to step ST64 of FIG. 16 may be the vehicle 2 for which the traveling control information is to be generated by the remote control apparatus 4.

In step ST71, the server CPU 15 may determine whether a periodic timing for generation of the traveling control information has arrived. The traveling control information may be, for example, information on a travelable range in which the vehicle 2 is estimated to be able to move within a predetermined period of time. In this case, the server CPU 15 may determine whether the periodic timing has arrived that is shorter than time predicted to be taken for the vehicle 2 to reach the boundary of the travelable range. If the periodic timing at which the traveling control information is to be generated has not arrived (ST71: N), the server CPU 15 may end this control. If the periodic timing at which the traveling control information is to be generated has arrived (ST71: Y), the server CPU 15 may cause the flow to proceed to step ST72.

In step ST72, the server CPU 15 may acquire the latest field information. The field information may include, for example, movement speed and direction included in the vehicle information of the traveling plurality of vehicles 2, and traffic information in a region that is managed by the remote control apparatus 4.

In step ST73, the server CPU 15 may map the positions of the plurality of vehicles 2 in the virtual space based on the high-precision map data, for example, and generate the range in which each of the mapped vehicles 2 is able to travel and the direction in which each of the mapped vehicles 2 is able to travel.

In step ST74, the server CPU 15 may generate traveling control information of each vehicle 2 including information on the travelable range and the travelable direction generated for each vehicle 2. The traveling control information may include, for example, information on a priority.

In step ST75, the server CPU 15 may transmit, to each vehicle 2, the traveling control information generated for each of the plurality of vehicles 2 in step ST74. This enables the plurality of vehicles 2 to each obtain, as the traveling control information of the vehicle 2 in step ST10, information useful for the traveling control regarding, for example, the range in which the vehicle 2 is able to travel and the direction in which the vehicle 2 is able to travel.

Figure 18:
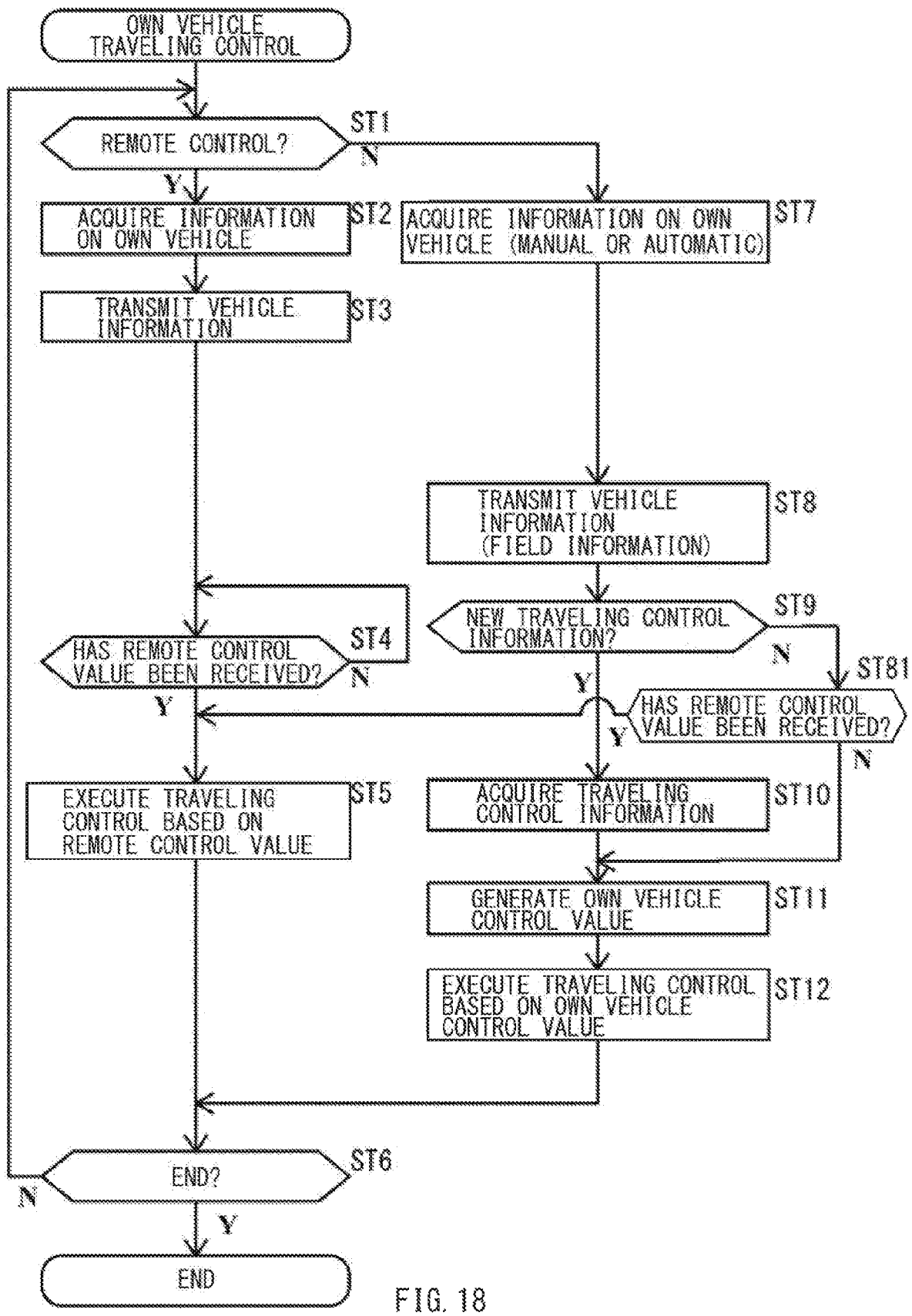
FIG. 18 is a flowchart illustrating the own vehicle traveling control to be performed by the control system of the vehicle, according to one example embodiment of the technology.

FIG. 18 is a flowchart illustrating the own vehicle traveling control to be performed by the control system 3 of the vehicle 2, according to the third example embodiment of the technology.

The traveling control ECU 24 of the control system 3 of the vehicle 2 may repeatedly execute the own vehicle traveling control illustrated in FIG. 18 to control the traveling of the own vehicle.

Note that a control ECU other than the traveling control ECU 24 of the control system 3 of the vehicle 2, such as the remote control ECU 29 indicated by the dashed line in FIG. 3, may repeatedly execute some processes of the own vehicle traveling control illustrated in FIG. 18, for example, processes from step ST2 to ST5 of FIG. 18.

Step ST1 to step ST12 may be similar to those in FIG. 5.

If it is determined that new traveling control information has not been received from the remote control apparatus 4 in step ST9 (ST9: N), the traveling control ECU 24 may cause the flow to proceed to step ST81.

In step ST81, the traveling control ECU 24 may determine whether a remote control value has been received, instead of traveling control information, from the remote control apparatus 4. In a case where the server 5 of the remote control apparatus 4 determines that the vehicle 2 is in a state of being unable to travel in step ST62 of the switching control illustrated in FIG. 16, the server 5 may execute the remote control in step ST63, instead of the traveling control information generation control in step ST64. In this case, the server 5 of the remote control apparatus 4 may transmit the remote control value this time to the vehicle 2 to which the traveling control information has been transmitted previously. The remote control value generator 6 of the remote control apparatus 4 may generate the remote control value by different processes depending on the magnitude of the communication delay of the vehicle information that has been transmitted, for the process of generating the traveling control information, by the vehicle 2 whose inability has been determined.

If a remote control value has been received as new information from the server 5 (ST81: Y), the traveling control ECU 24 may cause the flow to proceed to step ST5, and execute the traveling control based on the remote control value.

If a remote control value has not been received as new information from the server 5 (ST81: N), the traveling control ECU 24 may cause the flow to proceed to step ST11, generate the own vehicle control value, and execute the traveling control based on the own vehicle control value.

As described above, in a case where the remote control value is received from the remote control apparatus 4, the traveling control ECU 24 serving as the traveling control unit of each vehicle 2 may preferentially use, for the traveling control of the vehicle 2, the remote control value over the own vehicle control value generated by the own vehicle.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, in an example embodiment described above, the priority and the generation switching may be finally determined by the server 5 of the remote control apparatus 4.

In another example, the priority and the generation switching may be finally determined by each vehicle 2.

In an example embodiment described above, the remote control apparatus 4 may include one server 5 and one remote control value generator 6.

In another example, the server 5 or the remote control value generator 6 of the remote control apparatus 4 may include a plurality of devices by, for example, being divided in predetermined units. The predetermined unit may be, for example, a region or the number of vehicles. The server 5 or the remote control value generator 6 may be divided into a plurality of devices by function or processing load. The plurality of servers 5 or the plurality of remote control value generators 6 may be distributed by, for example, being incorporated in the base stations 9 of the fifth-generation communication network 8.

Each of the remote control value generator 6, the server CPU 15, and the traveling control ECU 24 illustrated in FIGS. 1 to 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the remote control value generator 6, the server CPU 15, and the traveling control ECU 24. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the remote control value generator 6, the server CPU 15, and the traveling control ECU 24 illustrated in FIGS. 1 to 3.

The invention claimed is:

1. A vehicle traveling remote control system in which vehicles and a remote control apparatus separate from the vehicles are configured to communicate with each other to repeatedly transmit, from the remote control apparatus to each of the vehicles, a remote control value to be used to control traveling of each of the vehicles, the vehicle traveling remote control system comprising:
   the remote control apparatus including:
      a server configured to:
         determine a communication delay of vehicle information including detection information received from each of the vehicles;
         synchronize a traveling control cycle of each of the vehicles with a communication cycle of the vehicle information based on the determined communication delay, the traveling control cycle corresponding to a reception cycle of the remote control value repeatedly transmitted from the remote control apparatus to each of the vehicles, the synchronization being based on common timing information; and
      a remote control value generating unit configured to repeatedly generate, based on the detection information detected by each of the vehicles, the remote control value for traveling control of each of the vehicles by a process that varies depending on the communication delay and based on the synchronization of the traveling control cycle with the communication cycle; and
   a traveling control unit to be provided in each of the vehicles, the traveling control unit being configured to execute the traveling control on a basis of the remote control value repeatedly received by the each of the vehicles from the remote control apparatus.

2. The vehicle traveling remote control system according to claim 1, wherein the remote control apparatus is configured to generate, by the remote control value generating unit, as the remote control value, a steering remote control value for traveling toward a steering control target point on a road, the steering control target point becoming farther depending on the communication delay of the vehicle information including the detection information.

3. The vehicle traveling remote control system according to claim 2, wherein the remote control apparatus is configured to,
   on a condition that a communication cycle of the vehicle information including the detection information is equal to or less than a reference traveling control cycle corresponding to a generation cycle in which the remote control apparatus repeatedly generates the remote control value,
   generate, by the remote control value generating unit, a steering amount remote control value for traveling toward the steering control target point in standard traveling control target time corresponding to the reference traveling control cycle, the steering amount remote control value serving as the remote control value, and,
   on a condition that the communication cycle of the vehicle information including the detection information is longer than the reference traveling control cycle corresponding to the generation cycle,
   generate, by the remote control value generating unit, the steering amount remote control value for traveling toward the steering control target point, by using the steering control target point that becomes farther depending on a magnitude of a time difference between the communication cycle of the vehicle information and the standard traveling control target time.

4. The vehicle traveling remote control system according to claim 3, wherein the remote control apparatus is configured to
   give, to the remote control value generating unit, at least the steering control target point on the road and a curvature target point on the road, the curvature target point being used for steering based on the remote control value, and
   cause the remote control value generating unit to generate the steering amount remote control value for traveling toward the steering control target point through the curvature target point.

5. The vehicle traveling remote control system according to claim 4, wherein the remote control apparatus is configured to,
   on a condition that the communication cycle of the vehicle information including the detection information becomes longer than the reference traveling control cycle corresponding to the generation cycle, and the steering control target point to be given to the remote control value generating unit is made farther depending on the magnitude of the time difference of the communication cycle,
   request each of the vehicles to execute the traveling control in a cycle corresponding to the steering control target point made farther.

6. The vehicle traveling remote control system according to claim 4, wherein
   as an acceleration or deceleration remote control value to be generated as the remote control value after a steering amount remote control value,
   the remote control value generating unit is configured to generate the acceleration or deceleration remote control value that allows for keeping of an inter-vehicle distance in time of a communication cycle that becomes longer depending on the communication delay of the vehicle information including the detection information.

7. The vehicle traveling remote control system according to claim 4, wherein
   the remote control apparatus includes
   a traveling control information generating unit configured to generate, by using field information including the vehicle information received from each of the vehicles, traveling control information for a vehicle control value generating unit of each of the vehicles to generate a vehicle control value for the each of the vehicles, and a switching control unit configured to switch a generation process for the each of the vehicles between a generation process by the traveling control information generating unit and a generation process by the remote control value generating unit, the switching control unit is configured to, on a condition that inability regarding the each of the vehicles is determined or on a condition that the each of the vehicles is determined as traveling in a specific area, switch the generation process for the each of the vehicles from the generation process by the traveling control information generating unit to the generation process by the remote control value generating unit, and the remote control value generating unit is configured to generate the remote control value by a different process that varies depending on the communication delay of the vehicle information that has been transmitted, for the generation process by the traveling control information generating unit, by the vehicle regarding which the inability has been determined or the each of the vehicles that has been determined as traveling in the specific area.

8. The vehicle traveling remote control system according to claim 3, wherein the remote control apparatus is configured to, on a condition that the communication cycle of the vehicle information including the detection information becomes longer than the reference traveling control cycle corresponding to the generation cycle, and the steering control target point to be given to the remote control value generating unit is made farther depending on the magnitude of the time difference of the communication cycle, request each of the vehicles to execute the traveling control in a cycle corresponding to the steering control target point made farther.

9. The vehicle traveling remote control system according to claim 3, wherein as an acceleration or deceleration remote control value to be generated as the remote control value after a steering amount remote control value, the remote control value generating unit is configured to generate the acceleration or deceleration remote control value that allows for keeping of an inter-vehicle distance in time of a communication cycle that becomes longer depending on the communication delay of the vehicle information including the detection information.

10. The vehicle traveling remote control system according to claim 3, wherein the remote control apparatus includes a traveling control information generating unit configured to generate, by using field information including the vehicle information received from each of the vehicles, traveling control information for a vehicle control value generating unit of each of the vehicles to generate a vehicle control value for the each of the vehicles, and a switching control unit configured to switch a generation process for the each of the vehicles between a generation process by the traveling control information generating unit and a generation process by the remote control value generating unit, the switching control unit is configured to, on a condition that inability regarding the each of the vehicles is determined or on a condition that the each of the vehicles is determined as traveling in a specific area, switch the generation process for the each of the vehicles from the generation process by the traveling control information generating unit to the generation process by the remote control value generating unit, and the remote control value generating unit is configured to generate the remote control value by a different process that varies depending on the communication delay of the vehicle information that has been transmitted, for the generation process by the traveling control information generating unit, by the vehicle regarding which the inability has been determined or the each of the vehicles that has been determined as traveling in the specific area.

11. The vehicle traveling remote control system according to claim 2, wherein as an acceleration or deceleration remote control value to be generated as the remote control value after a steering amount remote control value, the remote control value generating unit is configured to generate the acceleration or deceleration remote control value that allows for keeping of an inter-vehicle distance in time of a communication cycle that becomes longer depending on the communication delay of the vehicle information including the detection information.

12. The vehicle traveling remote control system according to claim 2, wherein the remote control apparatus includes a traveling control information generating unit configured to generate, by using field information including the vehicle information received from each of the vehicles, traveling control information for a vehicle control value generating unit of each of the vehicles to generate a vehicle control value for the each of the vehicles, and a switching control unit configured to switch a generation process for the each of the vehicles between a generation process by the traveling control information generating unit and a generation process by the remote control value generating unit, the switching control unit is configured to, on a condition that inability regarding the each of the vehicles is determined or on a condition that the each of the vehicles is determined as traveling in a specific area, switch the generation process for the each of the vehicles from the generation process by the traveling control information generating unit to the generation process by the remote control value generating unit, and the remote control value generating unit is configured to generate the remote control value by a different process that varies depending on the communication delay of the vehicle information that has been transmitted, for the generation process by the traveling control information generating unit, by the vehicle regarding which the inability has been determined or the each of the vehicles that has been determined as traveling in the specific area.

13. The vehicle traveling remote control system according to claim 1, wherein as an acceleration or deceleration remote control value to be generated as the remote control value after a steering amount remote control value, the remote control value generating unit is configured to generate the acceleration or deceleration remote control value that allows for keeping of an inter-vehicle distance in time of a communication cycle that becomes longer depending on the communication delay of the vehicle information including the detection information.

14. The vehicle traveling remote control system according to claim 1, wherein the remote control apparatus includes a traveling control information generating unit configured to generate, by using field information including the vehicle information received from each of the vehicles, traveling control information for a vehicle control value generating unit of each of the vehicles to generate a vehicle control value for the each of the vehicles, and a switching control unit configured to switch a generation process for the each of the vehicles between a generation process by the traveling control information generating unit and a generation process by the remote control value generating unit, the switching control unit is configured to, on a condition that inability regarding the each of the vehicles is determined or on a condition that the each of the vehicles is determined as traveling in a specific area, switch the generation process for the each of the vehicles from the generation process by the traveling control information generating unit to the generation process by the remote control value generating unit, and the remote control value generating unit is configured to generate the remote control value by a different process that varies depending on the communication delay of the vehicle information that has been transmitted, for the generation process by the traveling control information generating unit, by the vehicle regarding which the inability has been determined or the each of the vehicles that has been determined as traveling in the specific area.

15. The vehicle traveling remote control system according to claim 1, wherein the server is further configured to obtain the common timing information from a global navigation satellite system.

16. A vehicle traveling remote control system in which vehicles and a remote control apparatus separate from the vehicles are configured to communicate with each other to repeatedly transmit, from the remote control apparatus to each of the vehicles, a remote control value to be used to control traveling of each of the vehicles, the vehicle traveling remote control system comprising:

the remote control apparatus configured to:
determine a communication delay of vehicle information including detection information received from each of the vehicles;
synchronize a traveling control cycle of each of the vehicles with a communication cycle of the vehicle information based on the determined communication delay, the traveling control cycle corresponding to a reception cycle of the remote control value repeatedly transmitted from the remote control apparatus to each of the vehicles, the synchronization being based on common timing information; and
repeatedly generate, based on the detection information detected by each of the vehicles, the remote control value for traveling control of each of the vehicles by a process that varies depending on the communication delay and based on the synchronization of the traveling control cycle with the communication cycle; and circuitry to be provided in each of the vehicles, the circuitry being configured to execute the traveling control on a basis of the remote control value repeatedly received by the each of the vehicles from the remote control apparatus.

17. The vehicle traveling remote control system according to claim 16, wherein the remote control apparatus is further configured to obtain the common timing information from a global navigation satellite system.

* * * * *